(12) United States Patent
Stojanovski et al.

(10) Patent No.: US 11,032,873 B2
(45) Date of Patent: Jun. 8, 2021

(54) SESSION CONTINUITY IN MOBILE SYSTEMS USING USER PLANE FUNCTIONS WITH UPLINK CLASSIFIER

(71) Applicant: Apple Inc., Cupertino, CA (US)

(72) Inventors: Alexandre Saso Stojanovski, Paris (FR); Changhong Shan, Portland, OR (US); Yifan Yu, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/417,921

(22) Filed: May 21, 2019

(65) Prior Publication Data

US 2019/0274185 A1    Sep. 5, 2019

Related U.S. Application Data

(60) Provisional application No. 62/674,857, filed on May 22, 2018.

(51) Int. Cl.
| | |
|---|---|
| *H04W 80/10* | (2009.01) |
| *H04W 76/12* | (2018.01) |
| *H04W 76/32* | (2018.01) |
| *H04W 76/11* | (2018.01) |
| *H04L 12/851* | (2013.01) |
| *H04L 29/12* | (2006.01) |

(52) U.S. Cl.
CPC ......... *H04W 80/10* (2013.01); *H04L 47/2441* (2013.01); *H04L 61/1511* (2013.01); *H04W 76/11* (2018.02); *H04W 76/12* (2018.02); *H04W 76/32* (2018.02)

(58) Field of Classification Search
CPC .... H04W 80/10; H04W 76/32; H04L 47/2441
See application file for complete search history.

(56) References Cited

U.S. PATENT DOCUMENTS

| | | | |
|---|---|---|---|
| 2018/0279180 A1* | 9/2018 | Lee | H04W 36/0011 |
| 2019/0335392 A1* | 10/2019 | Qiao | H04W 8/08 |
| 2019/0394745 A1* | 12/2019 | Yu | H04W 76/16 |
| 2020/0351984 A1* | 11/2020 | Talebi Fard | H04W 4/08 |

OTHER PUBLICATIONS

3GPP, "Technical Specification Group Services and System Aspects; System Architecture for the 5G System; Stage 2 (Release 15)," 3GPP TS 23.501 V15.1.0 (Mar. 2018), 5G, 201 pages.
3GPP, "Technical Specification Group Services and System Aspects; Procedures for the 5G System; Stage 2 (Release 15)," 3GPP TS 23.502 V15.1.0 (Mar. 2018), 5G, 285 pages.
3GPP, "Technical Specification Group Services and System Aspects; Policy and Charging Control Framework for the 5G System; Stage 2 release 15)," 3GPP TS 23.503 V15.1.0 (Mar. 2018), 5G, 65 pages.
3GPP, "Technical Specification Group Services and System Aspects; Study on enhancement of URLLC supporting in 5GC (Release 16)," 3GPP TR 23.725 V0.1.0 (Apr. 2018), 5G, 10 pages.

* cited by examiner

*Primary Examiner* — Yemane Mesfin
*Assistant Examiner* — Henry Baron
(74) *Attorney, Agent, or Firm* — Sterne, Kessler, Goldstein & Fox P.L.L.C.

(57) ABSTRACT

Embodiments of the present disclosure session continuity within mobile systems using user plane functions with uplink classifiers. Other embodiments may be described and claimed.

23 Claims, 11 Drawing Sheets

SESSION CONTINUITY IN MOBILE SYSTEMS USING USER PLANE FUNCTIONS WITH UPLINK CLASSIFIER

CROSS REFERENCE TO RELATED APPLICATION

The present application claims priority to U.S. Provisional Patent Application No. 62/674,857, filed May 22, 2018, and entitled "Session Continuity in Mobile Systems using User Plane Functions with Uplink Classifier." The disclosure of this provisional application is hereby incorporated by reference in its entirety.

FIELD

Embodiments of the present invention relate generally to the technical field of wireless communications.

BACKGROUND

The Release 15 (Rel. 15) system architecture for 3rd Generation Partnership Project (3GPP) 5G System "Phase 1" has been specified in 3GPP Technical Specification (TSs) 23.501 v15.1.0 (2018-03-28), TS 23.502 v15.1.0 (2018-03-27), and TS 23.503 v15.1.0 (2018-03-07). The current architecture and functionality is challenged by various session continuity scenarios.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 4 illustrates an architecture of a system of a network in accordance with some embodiments.

FIG. 5 illustrates an example of an infrastructure equipment in accordance with various embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
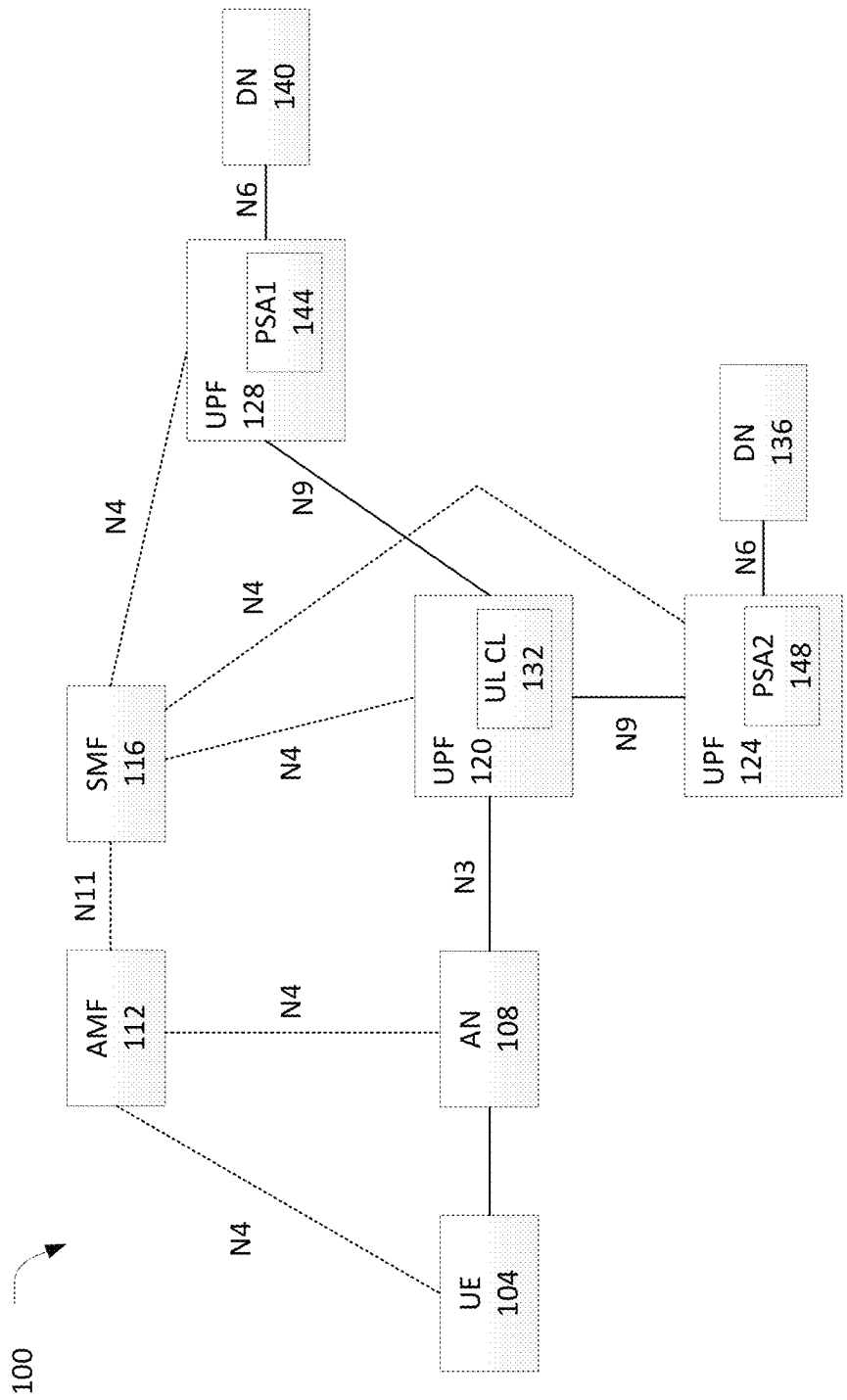
FIG. 1 illustrates a network in accordance with some embodiments.

FIG. 1 illustrates a network 100 in accordance with some embodiments. In general, the components shown in network 100 may be similar to, and substantially interchangeable with, like-named components in other figures described herein.

The UE 104 and the access node 108 may each be coupled with an access and mobility management function (AMF) 112 over N4 interface (also referred to as "reference interface" or "reference point"). The AMF 112 may be a network function that handles various connection and mobility management tasks. The AMF 112 may forward messages related to session management to a session management function (SMF) 116 over an N11 interface. The SMF 116 may manage protocol data unit (PDU) sessions in session context within user plane functions (UPFs) such as, for example, UPF 120, UPF 124, and UPF 128. The SMF 116 may interact with the UPFs over N4 reference points.

The SMF 116 may determine whether to insert an uplink classifier within a data path of a PDU session. For example, the SMF 116 may cause the UPF 120 to instantiate an uplink classifier (UL CL) 132 and may provide the UL CL 132 with certain traffic filters. The UL CL 132 may then divert traffic that matches the filters to local resources in, for example, local data networks (DNs) such as DN 136 or DN 140.

The DNs 136/140 may be coupled with UPFs 124/128 over respective N6 interfaces.

From a perspective of the UE 104, the existence of the UPF 120 with UL CL 132 is transparent. The UE 104 may be assigned a single Internet protocol (IP) address (or IPv6 prefix) that is hosted by a remote PDU Session Anchor (PSA), for example, PSA1 144 in UPF 128. The uplink traffic that is diverted by the UL CL 132 towards a local PSA, for example, PSA2 148 in UPF 124, uses the same UE IP address/prefix as the traffic that is forwarded towards the PSA1 144. In contrast to the remote PSA1 144, the local PSA2 148 does not have a role in the assignment of the IP address/prefix to the UE 104 and the traffic forwarding on an N6 interface associated with the local PSA2 148 is not specified by the Phase 1 system described in the 3GPP TSs mentioned above.

Due to mobility of the UE 104, an intermediate UPF with a UL CL may need to be relocated, for example, from a source UL CL (S-ULCL) to a (T-ULCL). This may also imply relocation of a local PSA. In the Phase 1 system, when traffic is diverted to a T-ULCL, any ongoing sessions between a UE and a source application node will be interrupted. After the disruption, the UE can perform a new domain name server (DNS) resolution request in order to determine the IP address of a new content distribution server, establish a TLS session with the new server, and continue fetching the content. The data flow between UE and a target application node will then continue flowing. Nevertheless, the user experience will suffer because of the disruption which is likely to occur upon every handover.

To address these challenges, embodiments described herein provide mechanisms to ensure desired session continuity during UE mobility. Embodiments may enhance session continuity while maintaining user plane (UP) efficiency by enabling nodes to coordinate in a situation in which an application relocates (based on, for example, a UE mobility event) from a first DN access identifier (DNAI) to a second DNAI. The DNAI may be an identifier of a user plane access to one or more DN(s) where applications are deployed. As used herein, a DNAI may be understood as an entry point to a DN (for example, a local DN).

Figure 2:
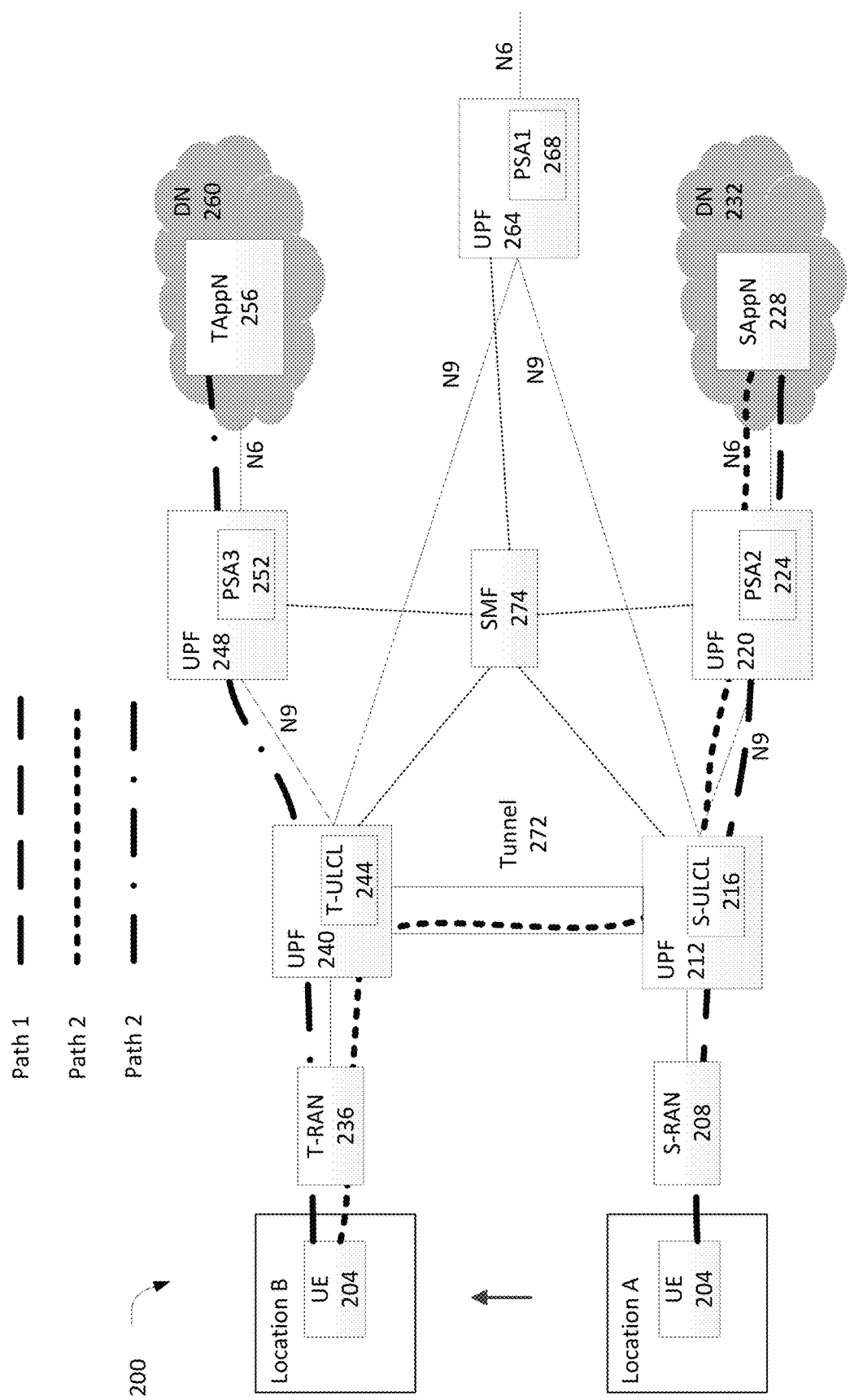
FIG. 2 illustrates a mobility event within a network in accordance with some embodiments.

FIG. 2 illustrates a network 200 in accordance with some embodiments. The network may include UE 204, source radio access network (S-RAN) 208, UPF 212 including a source UL CL (S-ULCL) 216, UPF 220 having PSA2 224, and a source application node (SAppN) 228 in a DN 232. The network 200 also includes a target radio access network (T-RAN) 236, UPF 240 including a target UL CL (T-ULCL) 244, UPF 248 having PSA3 252, and a target application node (TAppN) 256 in a DN 260. The network 200 may further include a UPF 264, having PSA1 268, coupled with UPFs 212/240.

The application nodes (or "servers") 228/256 may each include application functions to handle control plane traffic and applications to handle various user-plane traffic. See, for example, application server 630 described in further detail in FIG. 6.

Initially, for example, before a mobility event, the UE 204 may exchange traffic with the SAppN 228 via path 1, which goes through S-RAN 204, S-ULCL 216, and PSA2 224. A typical use case for edge computing is where the UE 204 fetches content from a content distribution server (for example, SAppN 228) located close to the network edge. Content fetching may be typically be based on hypertext transfer protocol secure (HTTPS), which means there is an established transport layer security (TLS) session between the UE 204 and the content distribution server (for example, SAppN 228).

At a mobility event in which the UE 204 moves from location A to location B, an SMF 274 may cause UPF 240 to instantiate T-ULCL 244. Upon instantiation of the T-ULCL 244, a forwarding tunnel 272 may be created between the S-ULCL 216 and the T-ULCL 244. The T-ULCL 244 may be configured with packet filters that force traffic from existing sessions (between UE 204 and SAppN 228) to be forwarded to S-ULCL 216 via path 2. Similarly, the S-ULCL 216 is configured to forward all downlink traffic for UE 204 coming from SAppN 228 towards the T-ULCL 244. Any new DNS requests are forced by the T-ULCL 244 to go to the new local DN 260 via PSA3 252 on path 3. Any traffic related to the TAppN 256 (for example, identified by an IP address of an application server in the new local DN 260) may also be forced by the T-ULCL 244 to go to the new local DN 260 via PSA3 252 on path 3.

In some embodiments, the SMF 274 may send a Late Notification to source app node 228 to inform it about a DN access identifier (DNAI) change. The notification may be performed in a manner similar to that described in clause 4.3.6.3 of TS 23.502, which defines notification procedures for user plane management events. Thus, an SMF may send a Late Notification to a source app node to inform it about, for example, a change of local PSA from PSA2 224 to PSA3 252. Based on this notification the source app node 228 can use upper layer (for example, IP level or hypertext transfer protocol (HTTP) level) mechanisms to redirect the ongoing traffic sessions towards a server in the new local DN 260 (for example, towards target app node 256).

Thus, establishing and using the forwarding tunnel 272 may avoid a brutal interruption in session continuity when the local PDU Session Anchor needs to be relocated due to UE mobility. This may be a useful feature for IP-based edge networking in that it will improve a user's experience. This feature may also be useful as a mobility enabler for Information Centric Networks (ICNs). Namely, although ICN makes abstraction of the underlying transport addressing and can continue fetching content despite the change of the network access point (corresponding to DNAI discussed herein), it would nevertheless be useful to keep a temporary forwarding tunnel between the UE and the old network access point for some time to allow for delivery of in-flight data.

In some embodiments, the forwarding tunnel 272 between the T-ULCL 244 and the S-ULCL 216 may be released upon detection of no active traffic for a configurable time interval. The detection may be performed by the S-ULCL 216, the T-ULCL 244, or the SAppN 228 and the decision for tunnel release may be performed by the SMF.

Figure 3:
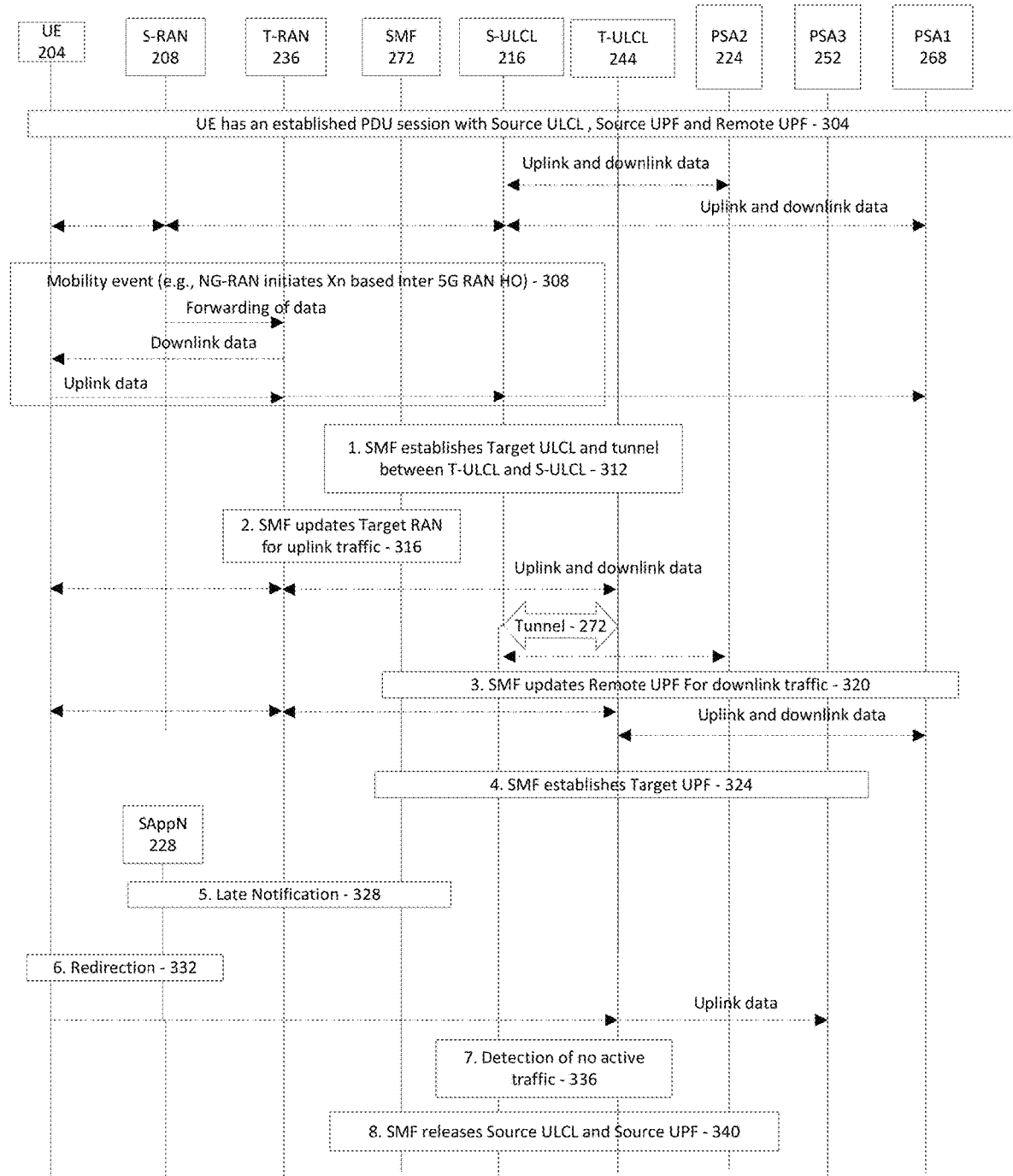
FIG. 3 illustrates a procedure in accordance with some embodiments.

FIG. 3 illustrates a procedure 300 in accordance with some embodiments. The procedure 300 may be performed by the devices shown in FIG. 2.

At 304, the procedure 300 may start at the UE 204 having established a PDU session with the S-ULCL 216, UPF 220, and remote UPF, for example, UPF 264. Uplink and downlink data may flow between the various components are shown. A mobility event may then occur at 308. The mobility event may be, for example, a radio access network (for example, a next generation radio access network (NG-RAN)) may initiate Xn-based inter-5G RAN handover. Data may be forwarded from the S-RAN 208 to the T-RAN 236, which then provides downlink data to, and receives uplink data from, the UE 204. The uplink data is transmitted from the T-RAN 236 to the PSA1 268.

The SMF 274 may decide to change the UL CL due to the mobility event. Detection of the mobility event may be based on an AMF notifying the SMF 274 that the T-RAN 236 has sent an N2 Path Switch Request message to the AMF. The SMF 274 may select the UPF 240 and, using the N4 interface, establish the T-ULCL 244 for the PDU Session.

The SMF 274 may also, at 312, establish (or cause the UPFs 212/240 to establish) the forwarding tunnel 272 between the T-ULCL 244 and the S-ULCL 216. The SMF 274 may provide the T-ULCL 244 with the necessary uplink forwarding rules towards PSA1 268, PSA3 252, and the forwarding tunnel (e.g., towards S-ULCL 216), including the Tunnel Info for each UPF. In addition, the AN Tunnel Info to T-RAN 236 may be provided to the T-ULCL 244 for downlink forwarding. The SMF 274 may provide traffic filters indicating what traffic shall be forwarded towards PSA1 268, PSA3 252, and S-ULCL 216, respectively. The T-ULCL 244 may provide the CN Tunnel Info to the SMF 274 for downlink traffic. At this point, the downlink traffic may go through the S-ULCL 216, T-ULCL 244, and T-RAN 236.

At 316, the SMF 274 may update the T-RAN 236 for uplink traffic. The SMF 274 may update the T-RAN 236 via N2 session management (SM) information over N11 interface. The SMF 274 may provide the new CN Tunnel Info corresponding to the T-ULCL 244. At this point, all uplink and downlink traffic between the UE 204 and the PSA2 224, as well as between the UE 204 and PSA1 268, may be forwarded via the tunnel 272 between the S-ULCL 216 and T-ULCL 244.

At 320, the SMF 274 may update the PSA1 268 in UPF 264, which may be referred to as the remote UPF, via an N4 interface. The SMF 274 may provide the PDU Session CN Tunnel Info for the downlink traffic. At this point all uplink and downlink traffic between the UE 204 and the PSA1 268 may be exchanged on the direct path between T-ULCL 244 and the PSA1 268.

At 324, the SMF 274 may select a local target UPF, for example, UPF 248 and PSA3, and use the N4 interface to establish the UPF 248 as the local target UPF for the PDU Session. If the T-ULCL 244 and the PSA3 are co-located in a single UPF, then 324 may be merged into 312.

At 328, the NSMF 274 may send a late notification message to the source app node 228 to indicate a change of DNAI (for example, a change of local PSA). The late notification message may optionally include an identifier (for example, an IP address or fully qualified domain name (FQDN)) pointing to the target app node 256.

At 332, the source app node 228 may redirect the UE 204 towards the target app node 256 using upper layer (for example, IP-level or HTTP-level) redirection mechanisms. The redirection may point to a specific target application node as indicated by the SMF 274 in the late notification message, or may be determined by the source app node 228 based on local configuration in the SAppN 228 (for example, configured mapping of DNAI and set of IP addresses or FQDNs). Based on this redirection the UE 204 may start to use a new destination IP address (with or without prior DNS resolution), which may lead the T-ULCL 244 to force the traffic towards PSA3 252.

At 336, either the S-ULCL 216 or the T-ULCL may detect no active traffic over the forwarding tunnel 272 during a preconfigured time interval. The detecting entity may then notify the SMF 274.

At 340, the SMF 274 may release the S-ULCL 216 and the Source UPF 220 (PSA2 224), thereby also releasing the tunnel 272.

In some embodiments, as an alternative to the detection of no active traffic at 336, the source app node 228 may send an explicit notification to the SMF 274 when traffic to or from the UE 204 ceases to exist. The SMF 274 may then release the S-ULCL 216 and the Source UPF 220 (PSA2 224) as described above at 340.

In this manner, embodiments of this disclosure provide for smooth relocation of the DNAI (for example, the local PSA) with no traffic interruption.

Figure 4:
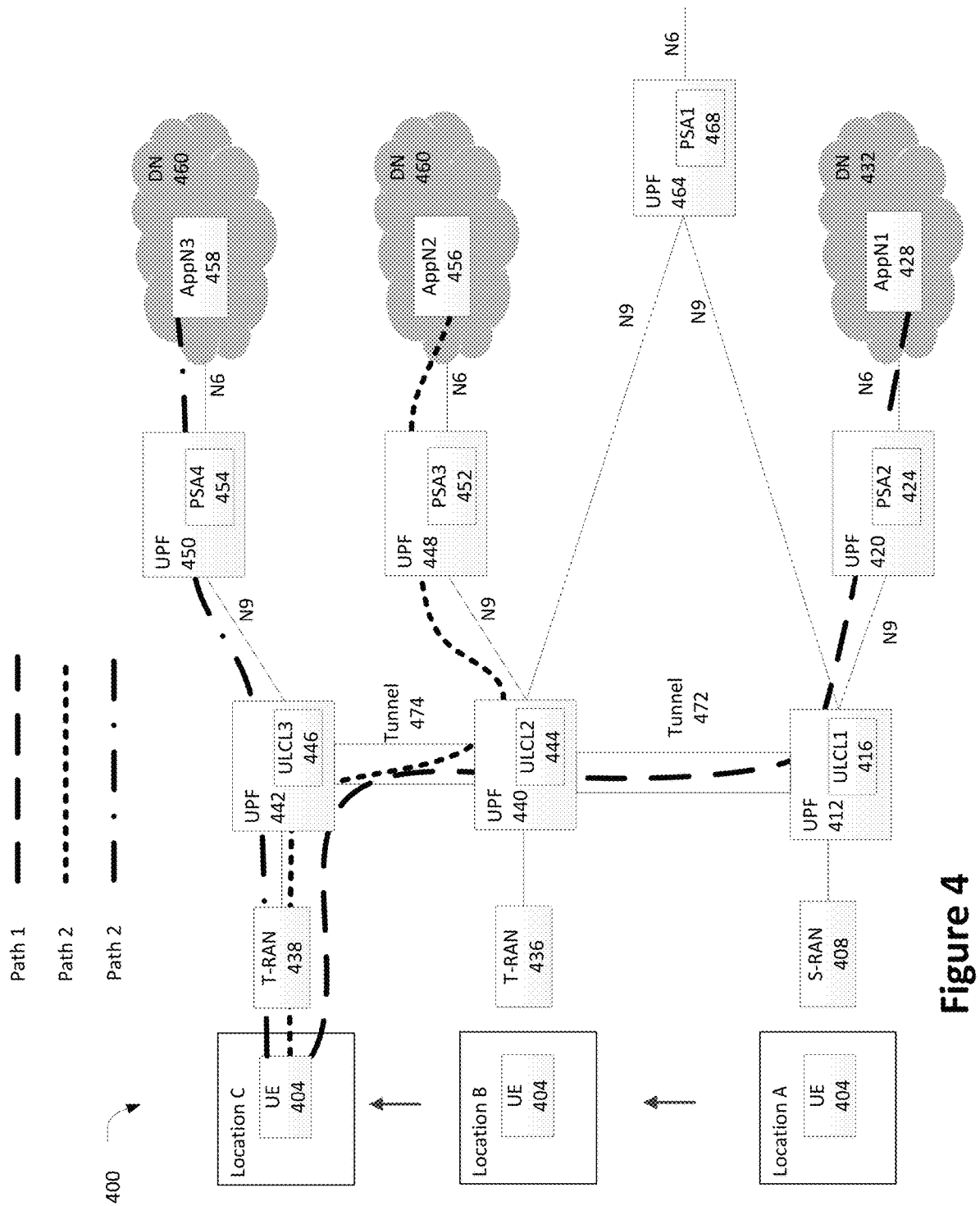
FIG. 4 illustrates a mobility event within a network in accordance with some embodiments.

FIG. 4 illustrates a network 400 in accordance with some embodiments. The network 400 may include elements similar to like-named elements in FIG. 2.

The network 400, may include UE 404 starting at location A, moving to location B, and then to location C. Thus, the UE 404 may be further handed over while an initial forwarding tunnel 472 is established between an initial source ULCL, for example, ULCL1 416, and target ULCL, for example, ULCL2 444. In this embodiment, an SMF (not explicitly shown in FIG. 4) may configure the intermediate ULCL node, for example, ULCL2 444, to forward the data from AppN2 456 over a second forwarding tunnel 474 between ULCL2 444 and ULCL3 446 via path 2. In addition to the data received from ULCL1 416 via the forwarding tunnel 472 (path 1).

This principle may be extend to additional chained ULCL nodes. However, in reality it is unlikely that more than three ULCL nodes in a row will be needed, because the older forwarding tunnels will be released over time due to absence of active traffic.

Figure 5:
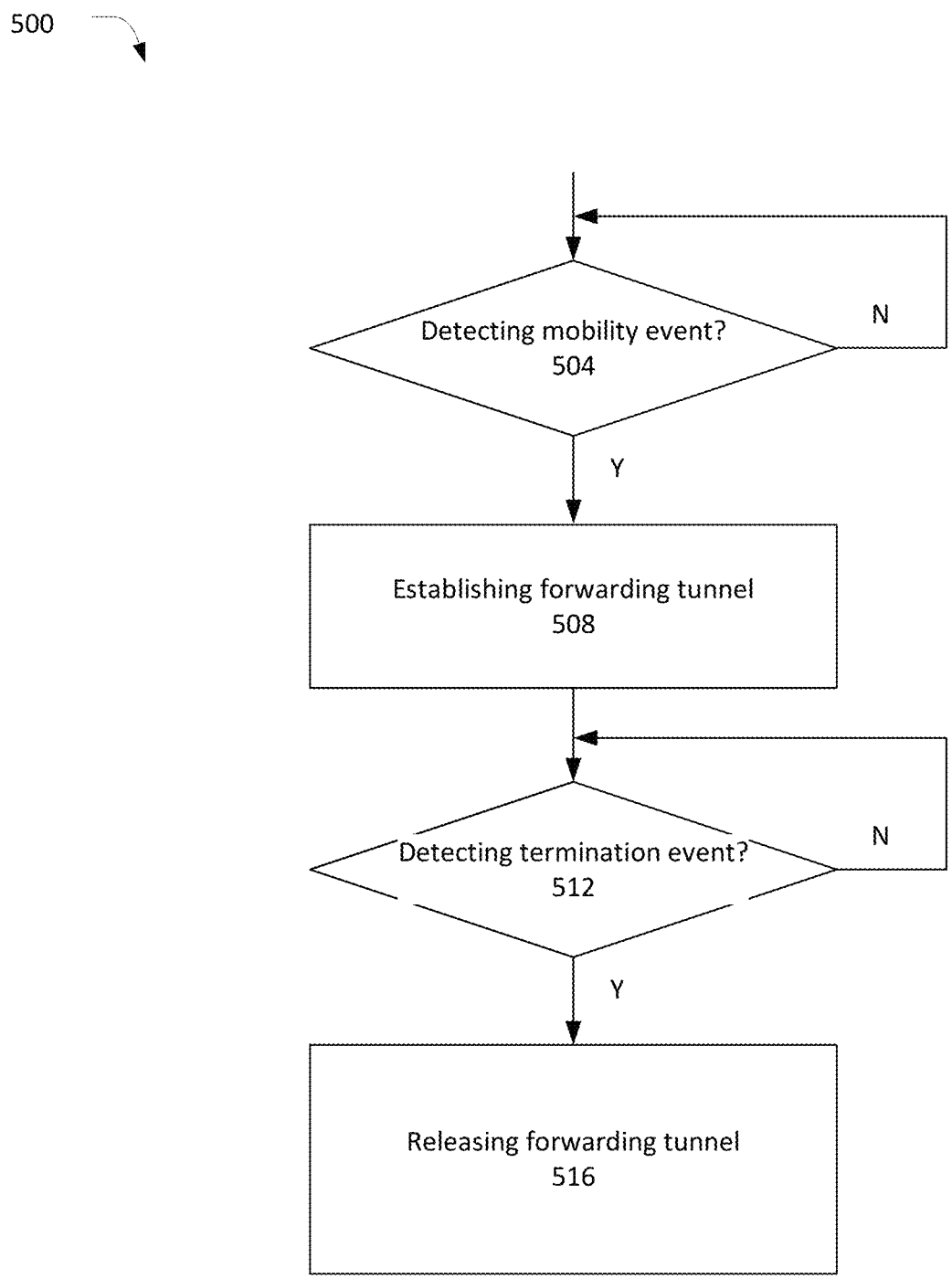
FIG. 5 illustrates an operation flow/algorithmic structure in accordance with some embodiments.

FIG. 5 illustrates an operation flow/algorithmic structure 500 in accordance with various embodiments. The operation flow/algorithmic structure 200 may be performed/implemented by an SMF, for example, the SMF 274, or components thereof, for example, control and interface circuitry disposed within an SMF.

At 504, the operation flow/algorithmic structure 500 may include detecting a mobility event. The mobility event may be associated with the UE 204 moving from a first location to a second location and accessing a network through a different RAN. This may cause an application with which the UE 204 is communicating, to relocate from a first DN, associated with the first DNAI, to a second DN, associated with a second DNAI. In some embodiments, the mobility event may be detected by the SMF receiving a notification from an AMF that a radio access network has sent a path switch request message to the AMF.

Upon detecting the mobility event at 504, the operation flow/algorithmic structure 500 may advance to establishing a forwarding tunnel at 508. The forwarding tunnel may be established by the SMF by the SMF generating session management messages that are transmitted to a source UPF and a target UPF. In some embodiments, the session management messages may cause the target UPF to instantiate a T-ULCL that is to establish or otherwise enforce routing through the forwarding tunnel.

The session management messages may further include packet filters that cause the S-ULCL and the T-ULCL to direct traffic through the forwarding tunnel as described herein. For example, with reference to FIG. 2, the packet filters may cause the T-ULCL 244 to force uplink traffic from existing sessions (between UE 204 and source application node 228) on the path 2: T-RAN 236-T-ULCL 244-S-ULCL 216-PSA2 224. Similarly, the packet filters may cause the S-ULCL 216 to forward all downlink traffic for UE 204 coming from source application node 228 into the forwarding tunnel 272 towards the T-ULCL 244.

The packet filters may further cause the T-ULCL 244 to force any new DNS requests (relating to the local DN 260) to go to the new local DN 260 (PSA3 252); force any traffic related to the target application node 256 (for example, identified by the IP address of the application node in the new local DN 260) to go to the new local DN 260 through PSA3 252; or let any remaining traffic go to the remote PDU Session Anchor (for example, PSA1 268).

At 512, the operation flow/algorithmic structure 500 may include detecting a termination event. In various embodiments, the detecting of the termination event may be based on a message that the SMF receives from a source UPF, a target UPF, or a source application node. For example, the source UPF for the target UPF may detect an absence of traffic through the forwarding tunnel for preconfigured period of time and may generate and send the message to the SMF to indicate the same. In some embodiments, the source application node may determine that traffic from or to the UE has ceased and send a message to notify the SMF of this determination.

Upon affirmatively detecting a termination event at 512, the operation flow/algorithmic structure 500 may further include, at 516, releasing the forwarding tunnel. Releasing of the forwarding tunnel may be performed by the SMF transmitting one or more session management messages to the source or target UPF to instruct release of the forwarding tunnel.

Figure 6:
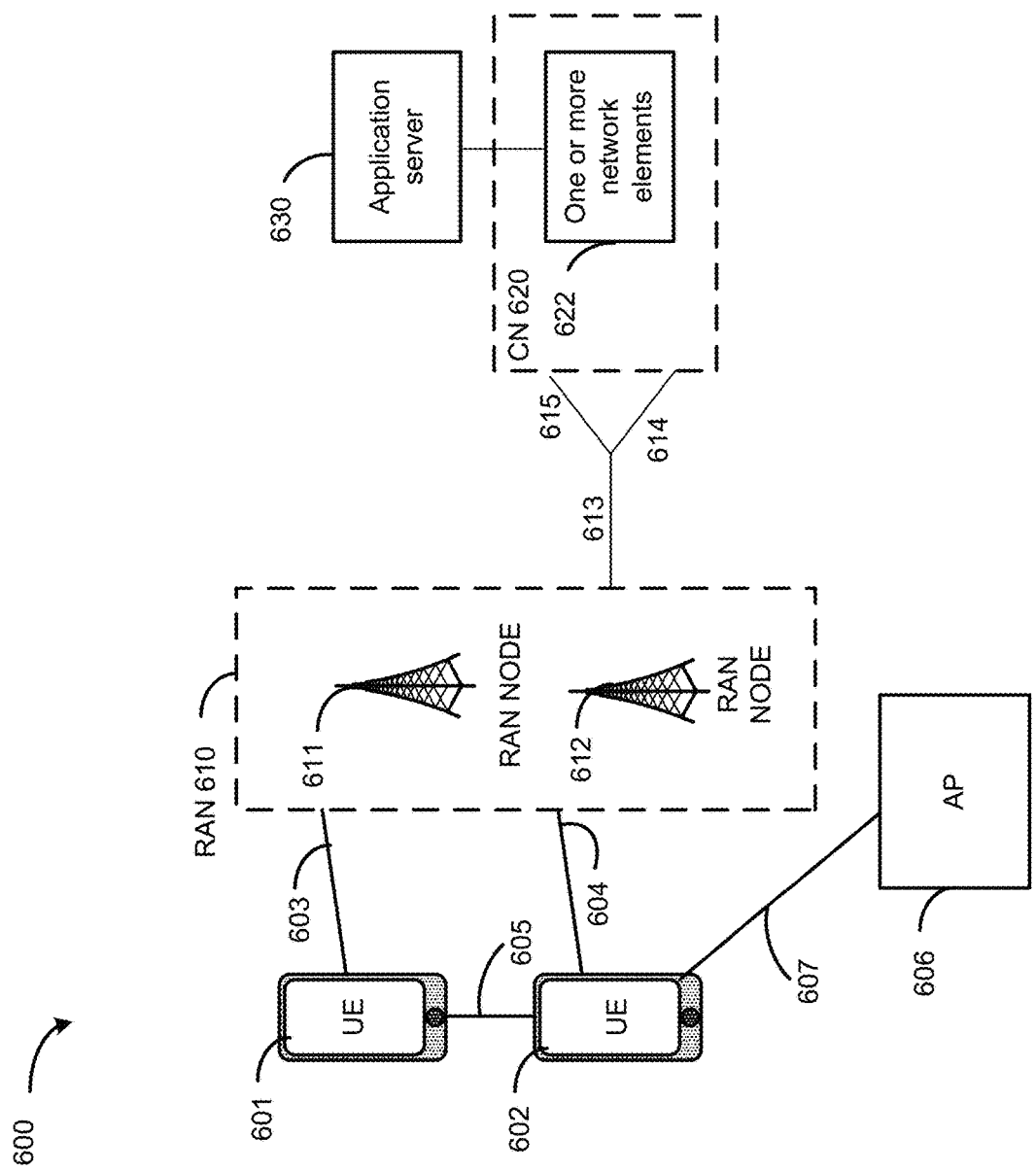
FIG. 6 illustrates an example architecture of the system of a network in accordance with some embodiments.

FIG. 6 illustrates an example architecture of a system 600 of a network is shown, in accordance with various embodiments. The following description is provided for an example system 600 that operates in conjunction with the as Long Term Evolution (LTE) system standards and the Fifth Generation (5G) or New Radio (NR) system standards as provided by 3rd Generation Partnership Project (3GPP) technical specifications (TS). However, the example embodiments are not limited in this regard and the described embodiments may apply to other networks that benefit from the principles described herein, such as future 3GPP systems (e.g., Sixth Generation (6G)) systems, Institute of Electrical and Electronics Engineers (IEEE) 802.16 protocols (e.g., Wireless metropolitan area networks (MAN), Worldwide Interoperability for Microwave Access (WiMAX), etc.), or the like.

As shown by FIG. 6, the system 600 may include user equipment (UE) 601a and UE 601b (collectively referred to as "UEs 601" or "UE 601"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 601 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 601 can comprise an IoT UE, which may comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 may be configured to connect, for example, communicatively couple, with a access network (AN) or radio access network (RAN) 610. In embodiments, the RAN 610 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Special Mobile) EDGE (GSM Evolution) Radio Access Network). As used herein, the term "NG RAN" or the like may refer to a RAN 610 that operates in an NR or 5G system 600, and the term "E-UTRAN" or the like may refer to a RAN 610 that operates in an LTE or 4G system 600. The UEs 601 utilize connections (or channels) 603 and 604, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 601 may directly exchange communication data via a ProSe interface 605. The ProSe interface 605 may alternatively be referred to as a sidelink (SL) interface 605 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 601b is shown to be configured to access an access point (AP) 606 (also referred to as also referred to as "WLAN node 606", "WLAN 606", "WLAN Termination 606" or "WT 606" or the like) via connection 607. The connection 607 can comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below). In various embodiments, the UE 601b, RAN 610, and AP 606 may be configured to utilize LTE-WLAN aggregation (LWA) operation and/or WLAN LTE/WLAN Radio Level Integration with IPsec Tunnel (LWIP) operation. The LWA operation may involve the UE 601b in RRC CONNECTED being configured by a RAN node 611 to utilize radio resources of LTE and WLAN. LWIP operation may involve the UE 601b using WLAN radio resources (e.g., connection 607) via Internet Protocol Security (IPsec) protocol tunneling to authenticate and encrypt packets (e.g., internet protocol (IP) packets) sent over the connection 607. IPsec tunneling may include encapsulating entirety of original IP packets and adding a new packet header thereby protecting the original header of the IP packets.

The RAN 610 can include one or more AN nodes or RAN nodes 611a and 611b (collectively referred to as "RAN nodes 611" or "RAN node 611") that enable the connections 603 and 604. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node 611 that operates in an NR or 5G system 600 (for example a gNB), and the term "E-UTRAN node" or the like may refer to a RAN node 611 that operates in an LTE or 4G system 600 (e.g., an eNB). According to various embodiments, the RAN nodes 611 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 611 may be implemented as one or more software entities running on server computers as part of a virtual network, which may be referred to as a cloud radio access network (CRAN). In other embodiments, the RAN nodes 611 may represent individual gNB-distributed units (DUs) that are connected to a gNB-centralized unit (CU) via an F1 interface (not shown by FIG. 6).

Any of the RAN nodes 611 can terminate the air interface protocol and can be the first point of contact for the UEs 601. In some embodiments, any of the RAN nodes 611 can fulfill various logical functions for the RAN 610 including, but not limited to, radio network controller (RNC) functions such as radio bearer management, uplink and downlink dynamic radio resource management and data packet scheduling, and mobility management.

In embodiments, the UEs 601 can be configured to communicate using Orthogonal Frequency-Division Multiplexing (OFDM) communication signals with each other or with any of the RAN nodes 611 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 to the UEs 601, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601. The physical downlink control channel (PDCCH) may carry information about the transport format and resource allocations related to the PDSCH channel, among other things. It may also inform the UEs 601 about the transport format, resource allocation, and H-ARQ (Hybrid Automatic Repeat Request) information related to the uplink shared channel. Typically, downlink scheduling (assigning control and shared channel resource blocks to the UE 601b within a cell) may be performed at any of the RAN nodes 611 based on channel quality information fed back from any of the UEs 601. The downlink resource assignment information may be sent on the PDCCH used for (e.g., assigned to) each of the UEs 601.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN nodes 611 may be configured to communicate with one another via interface 612. In embodiments where the system 600 is an LTE system, the interface 612 may be an X2 interface 612. The X2 interface may be defined between two or more RAN nodes 611 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP PDUs to a UE 601 from an SeNB for user data; information of PDCP PDUs that were not delivered to a UE 601; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 600 is a 5G or NR system, the interface 612 may be an Xn interface 612. The Xn interface is defined between two or more RAN nodes 611 (e.g., two or more gNBs and the like) that connect to 5GC 620, between a RAN node 611 (e.g., a gNB) connecting to 5GC 620 and an eNB, and/or between two eNBs connecting to 5GC 620. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 610 is shown to be communicatively coupled to a core network—in this embodiment, Core Network (CN) 620. The CN 620 may comprise a plurality of network elements 622, which are configured to offer various data and telecommunications services to customers/subscribers (e.g., users of UEs 601) who are connected to the CN 620 via the RAN 610. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 620 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 620 may be referred to as a network slice, and a logical instantiation of a portion of the CN 620 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 630 may be an element offering applications that use IP bearer resources with the core network (e.g., UMTS Packet Services (PS) domain, LTE PS data services, etc.). The application server 630 can also be configured to support one or more communication services (e.g., Voice-over-Internet Protocol (VoIP) sessions, PTT sessions, group communication sessions, social networking services, etc.) for the UEs 601 via the EPC 620.

In embodiments, the CN 620 may be a 5GC (referred to as "5GC 620" or the like), and the RAN 610 may be connected with the CN 620 via an NG interface 613. In embodiments, the NG interface 613 may be split into two parts, an NG user plane (NG-U) interface 614, which carries traffic data between the RAN nodes 611 and a user plane function (UPF), and the S1 control plane (NG-C) interface 615, which is a signaling interface between the RAN nodes 611 and Access and Mobility Functions (AMEs). Embodiments where the CN 620 is a 5GC 620 are discussed in more detail with regard to FIG. 8.

In embodiments, the CN 620 may be a 5G CN (referred to as "5GC 620" or the like), while in other embodiments, the CN 620 may be an Evolved Packet Core (EPC)). Where CN 620 is an EPC (referred to as "EPC 620" or the like), the RAN 610 may be connected with the CN 620 via an S1 interface 613. In embodiments, the S1 interface 63 may be split into two parts, an S1 user plane (S1-U) interface 614, which carries traffic data between the RAN nodes 611 and the serving gateway (S-GW), and the S1-mobility management entity (MME) interface 615, which is a signaling interface between the RAN nodes 611 and MMEs. An example architecture wherein the CN 620 is an EPC 620 is shown by FIG. 7.

Figure 7:
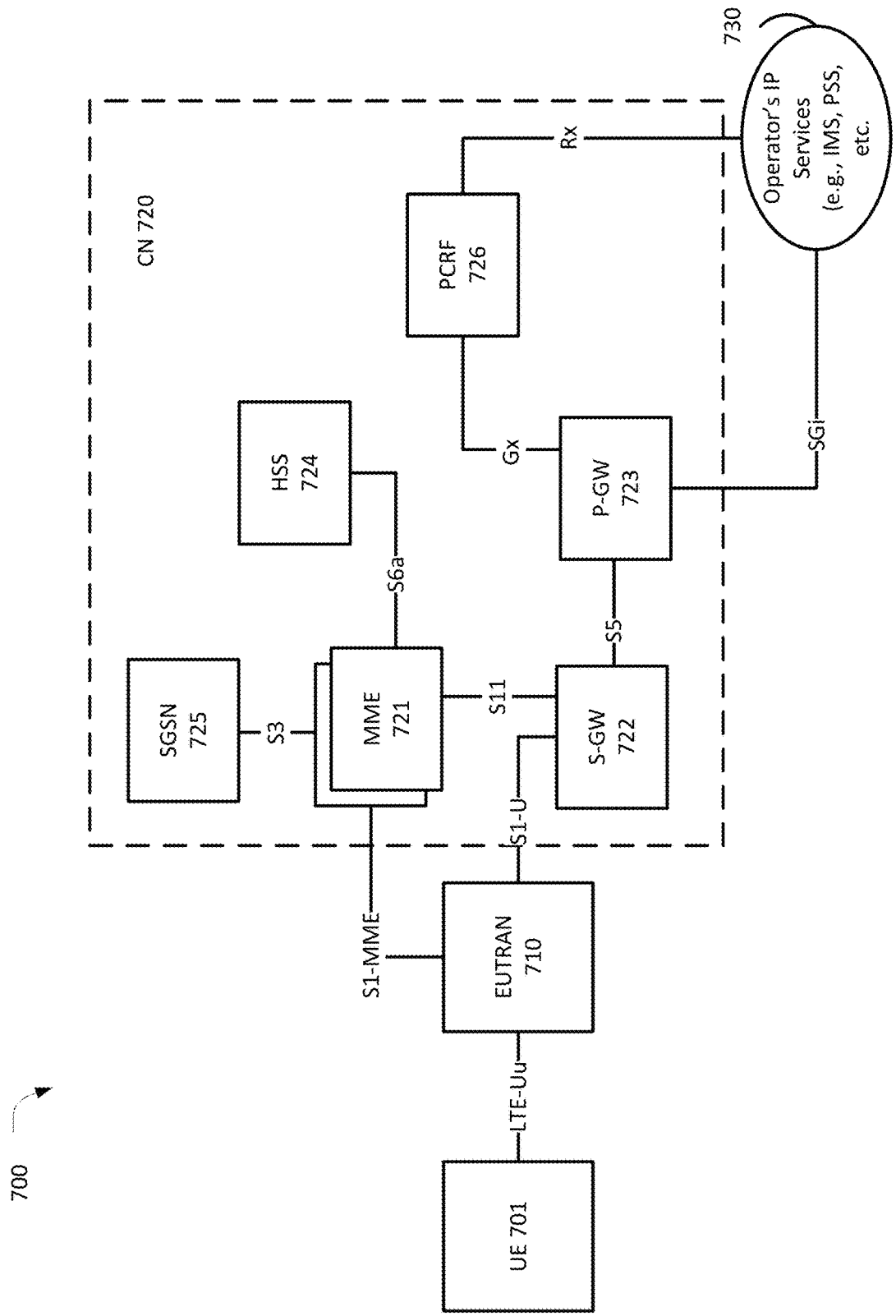
FIG. 7 illustrates an example architecture of a system in accordance with some embodiments.

FIG. 7 illustrates an example architecture of a system 700 including a first CN 720 is shown, in accordance with various embodiments. In this example, system 700 may implement the LTE standard wherein the CN 720 is an EPC 720 that corresponds with CN 620 of FIG. 6. Additionally, the UE 701 may be the same or similar as the UEs 601 of FIG. 6, and the EUTRAN 710 may be a RAN that is the same or similar to the RAN 610 of FIG. 6, and which may include RAN nodes 611 discussed previously. The CN 720 may comprise MMEs 721, an S-GW 722, a Packet Data Network (PDN) Gateway (P-GW) 723, a home subscriber server (HSS) 724, and a Serving General Packet Radio Service (GPRS) Support Nodes (SGSN) 725.

The MMEs 721 may be similar in function to the control plane of legacy SGSN, and may implement mobility management (MM) functions to keep track of the current location of a UE 701. The MMEs 721 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 701, provide user identity confidentiality, and/or other like services to users/subscribers. Each UE 701 and the MME 721 may include an MM or EMM sublayer, and an MM context may be established in the UE 701 and the MME 721 when an attach procedure is successfully completed. The MM context may be a data structure or database object that stores MM-related information of the UE 701. The MMEs 721 may be coupled with the HSS 724 via an S6a reference point, coupled with the SGSN 725 via an S3 reference point, and coupled with the S-GW 722 via an Sll reference point.

The SGSN 725 may be a node that serves the UE 701 by tracking the location of an individual UE 701 and performing security functions. In addition, the SGSN 725 may perform Inter-EPC node signaling for mobility between 2G/3G and E-UTRAN 3GPP access networks; PDN and S-GW selection as specified by the MMEs 721; handling of UE 701 time zone functions as specified by the MMEs 721; and MME selection for handovers to E-UTRAN 3GPP access network. The S3 reference point between the MMEs 721 and the SGSN 725 may enable user and bearer information exchange for inter-3GPP access network mobility in idle and/or active states.

The HSS 724 may comprise a database for network users, including subscription-related information to support the network entities' handling of communication sessions. The EPC 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc. An S6a reference point between the HHS 724 and the MMEs 721 may enable transfer of subscription and authentication data for authenticating/authorizing user access to the EPC 720 between HHS 724 and the MMEs 721.

The S-GW 722 may terminate the S1 interface 513 ("S1-U" in FIG. 7) towards the RAN 710, and routes data packets between the RAN 710 and the EPC 720. In addition, the S-GW722 may be a local mobility anchor point for inter-RAN node handovers and also may provide an anchor for inter-3GPP mobility. Other responsibilities may include lawful intercept, charging, and some policy enforcement. The S11 reference point between the S-GW 722 and the MMEs 721 may provide a control plane between the MMEs 721 and the S-GW 722. The S-GW 722 may be coupled with the P-GW 723 via an S5 reference point.

The P-GW 723 may terminate an SGi interface toward a Packet Data Network (PDN) 730. The P-GW 723 may route data packets between the EPC 720 and external networks such as a network including the application server 630 (alternatively referred to as application function (AF)) via an Internet Protocol (IP) interface 625 (see e.g., FIG. 6). In embodiments, the P-GW 723 may be communicatively coupled to an application server (application server 630 of FIG. 6 or PDN 730 in FIG. 7) via an IP communications interface 525 (see e.g., FIG. 6). The S5 reference point between the P-GW 723 and the S-GW 722 may provide user plane tunneling and tunnel management between the P-GW 723 and the S-GW 722. The S5 reference point may also be used for S-GW 722 relocation due to UE 701 mobility and if the S-GW 722 needs to connect to a non-collocated P-GW 723 for the required PDN connectivity. The P-GW 723 may further include a node for policy enforcement and charging data collection (e.g., Policy and Charging Enforcement Function (PCEF) (not shown). Additionally, the SGi reference point between the P-GW 723 and the packet data network (PDN) 730 may be an operator external public, a private PDN, or an intra operator packet data network, for example, for provision of IMS services. The P-GW 723 may be coupled with a PCRF 726 via a Gx reference point.

Policy and Charging Enforcement Function (PCRF) 726 is the policy and charging control element of the EPC 720. In a non-roaming scenario, there may be a single PCRF 726 in the Home Public Land Mobile Network (HPLMN) associated with an UE's 701 Internet Protocol Connectivity Access Network (IP-CAN) session. In a roaming scenario with local breakout of traffic, there may be two PCRFs associated with an UE's 701 IP-CAN session, a Home PCRF (H-PCRF) within a HPLMN and a Visited PCRF (V-PCRF) within a Visited Public Land Mobile Network (VPLMN). The PCRF may be communicatively coupled to the application server 730 via the P-GW 723. The application server 730 may signal the PCRF to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730. The Gx reference point between the PCRF 726 and the P-GW 723 may allow for the transfer of (QoS) policy and charging rules from the PCRF 726 to Policy and Charging Enforcement Function (PCEF) in the P-GW 723. An Rx reference point may reside between the PDN 730 (or "AF 730") and the PCRF 726

Figure 8:
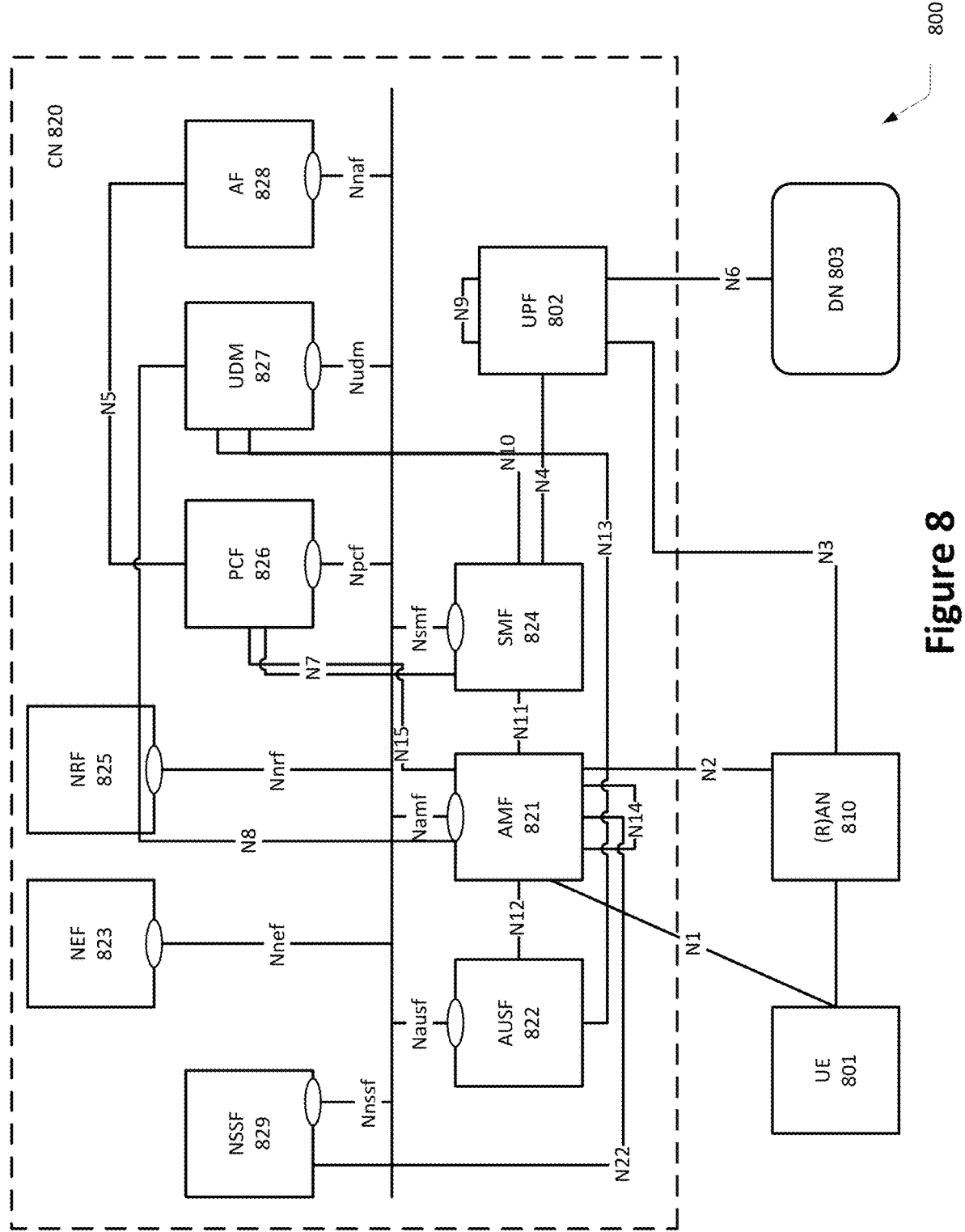
FIG. 8 illustrates an architecture of a system in accordance with some embodiments.

FIG. 8 illustrates an architecture of a system 800 including a second CN 820 is shown in accordance with various embodiments. The system 800 is shown to include a UE 801, which may be the same or similar to the UEs 601 and UE 701 discussed previously; a (R)AN 810, which may be the same or similar to the RAN 610 and RAN 710 discussed previously, and which may include RAN nodes 611 discussed previously; and a Data network (DN) 803, which may be, for example, operator services, Internet access or 3rd party services; and a 5G Core Network (5GC or CN) 820.

The 5GC 820 may include an Authentication Server Function (AUSF) 222; an Access and Mobility Management Function (AMF) 821; a Session Management Function (SMF) 824; a Network Exposure Function (NEF) 823; a Policy Control function (PCF) 826; a Network Function (NF) Repository Function (NRF) 825; a Unified Data Management (UDM) 827; an Application Function (AF) 828; a User Plane Function (UPF) 802; and a Network Slice Selection Function (NSSF) 829.

The UPF 802 may act as an anchor point for intra-RAT and inter-RAT mobility, an external PDU session point of interconnect to DN 803, and a branching point to support multi-homed PDU session. The UPF 802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 802 may include an uplink classifier to support routing traffic flows to a data network. The DN 803 may represent various network operator services, Internet access, or third party services. DN 803 may include, or be similar to application server 630 discussed previously. The UPF 802 may interact with the SMF 824 via an N4 reference point between the SMF 824 and the UPF 802.

The AUSF 822 may store data for authentication of UE 801 and handle authentication related functionality. The AUSF 822 may facilitate a common authentication framework for various access types. The AUSF 822 may communicate with the AMF 821 via an N12 reference point between the AMF 821 and the AUSF 822; and may communicate with the UDM 827 via an N13 reference point between the UDM 827 and the AUSF 822. Additionally, the AUSF 822 may exhibit an Nausf service-based interface.

The AMF 821 may be responsible for registration management (e.g., for registering UE 801, etc.), connection management, reachability management, mobility management, and lawful interception of AMF-related events, and access authentication and authorization. The AMF 821 may be a termination point for the an N11 reference point between the AMF 821 and the SMF 824. The AMF 821 may provide transport for Session Management (SM) messages between the UE 801 and the SMF 824, and act as a transparent proxy for routing SM messages. AMF 821 may also provide transport for short message service (SMS) messages between UE 801 and an SMS function (SMSF) (not shown by FIG. 8). AMF 821 may act as Security Anchor Function (SEA), which may include interaction with the AUSF 822 and the UE 801, receipt of an intermediate key that was established as a result of the UE 801 authentication process. Where USIM based authentication is used, the AMF 821 may retrieve the security material from the AUSF 822. AMF 821 may also include a Security Context Management (SCM) function, which receives a key from the SEA that it uses to derive access-network specific keys. Furthermore, AMF 821 may be a termination point of RAN CP interface, which may include or be an N2 reference point between the (R)AN 811 and the AMF 821; and the AMF 821 may be a termination point of NAS (N1) signalling, and perform NAS ciphering and integrity protection.

AMF 821 may also support NAS signalling with a UE 801 over an N3 interworking-function (IWF) interface. The N3IWF may be used to provide access to untrusted entities. N3IWF may be a termination point for the N2 interface between the (R)AN 810 and the AMF 821 for the control plane, and may be a termination point for the N3 reference point between the (R)AN 810 and the UPF 802 for the user plane. As such, the AMF 821 may handle N2 signalling from the SMF 824 and the AMF 821 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 801 and AMF 821 via an N1 reference point between the UE 801 and the AMF 821, and relay uplink and downlink user-plane packets between the UE 801 and UPF 802. The N3IWF also provides mechanisms for IPsec tunnel establishment with the UE 801. The AMF 821 may exhibit an Namf service-based interface, and may be a termination point for an N14 reference point between two AMFs 821 and an N17 reference point between the AMF 821 and a 5G-Equipment Identity Register (5G-EIR) (not shown by FIG. 8).

The UE 801 may need to register with the AMF 821 in order to receive network services. Registration Management (RM) is used to register or deregister the UE 801 with the network (e.g., AMF 821), and establish a UE context in the network (e.g., AMF 821). The UE 801 may operate in an RM-REGISTERED state or an RM-DEREGISTERED state. In the RM DEREGISTERED state, the UE 801 is not registered with the network, and the UE context in AMF 821 holds no valid location or routing information for the UE 801 so the UE 801 is not reachable by the AMF 821. In the RM REGISTERED state, the UE 801 is registered with the network, and the UE context in AMF 821 may hold a valid location or routing information for the UE 801 so the UE 801 is reachable by the AMF 821. In the RM-REGISTERED state, the UE 801 may perform mobility Registration Update procedures, perform periodic Registration Update procedure triggered by expiration of the periodic update timer (e.g., to notify the network that the UE 801 is still active), and perform a Registration Update procedure to update UE capability information or to re-negotiate protocol parameters with the network, among others.

The AMF 821 may store one or more RM contexts for the UE 801, where each RM context is associated with a specific access to the network. The RM context may be a data structure, database object, etc. that indicates or stores, inter alia, a registration state per access type and the periodic update timer. The AMF 821 may also store a 5GC MM context that may be the same or similar to the (E)MM context discussed previously. In various embodiments, the AMF 821 may store a CE mode B Restriction parameter of the UE 801 in an associated MM context or RM context. The AMF 821 may also derive the value, when needed, from the UE's usage setting parameter already stored in the UE context (and/or MM/RM Context).

Connection Management (CM) may be used to establish and release a signaling connection between the UE 801 and the AMF 821 over the N1 interface. The signaling connection is used to enable NAS signaling exchange between the UE 801 and the CN 80, and comprises both the AN signaling connection between the UE and the Access Network (AN) (e.g., RRC connection or UE-N3IWF connection for Non-3GPP access) and the N2 connection for the UE 801 between the AN (e.g., RAN 810) and the AMF 821. The UE 801 may operate in one of two CM states, CM-IDLE mode or CM-CONNECTED mode. When the UE 801 is operating in the CM-IDLE state/mode, the UE 801 may have no NAS signaling connection established with the AMF 821 over the N1 interface, and there may be (R)AN 810 signaling connection (e.g., N2 and/or N3 connections) for the UE 801. When the UE 801 is operating in the CM-CONNECTED state/mode, the UE 801 may have an established NAS signaling connection with the AMF 821 over the N1 interface, and there may be a (R)AN 810 signaling connection (e.g., N2 and/or N3 connections) for the UE 801. Establishment of an N2 connection between the (R)AN 810 and the AMF 821 may cause the UE 801 to transition from CM-IDLE mode to CM-CONNECTED mode, and the UE 801 may transition from the CM-CONNECTED mode to the CM-IDLE mode when N2 signaling between the (R)AN 810 and the AMF 821 is released.

The SMF 824 may be responsible for Session Management (SM) (e.g., session establishment, modify and release, including tunnel maintain between UPF and AN node); UE IP address allocation & management (including optional Authorization); selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. SM may refer to management of a PDU session, and a PDU session or "session" may refer to a PDU Connectivity Service that provides or enables the exchange of PDUs between a UE 801 and a data network (DN) 803 identified by a Data Network Name (DNN). PDU Sessions may be established upon UE 801 request, modified upon UE 801 and 5GC 820 request, and released upon UE 801 and 5GC 820 request using NAS SM signaling exchanged over the N1 reference point between the UE 801 and the SMF 824. Upon request from an Application Server, the 5GC 820 may trigger a specific application in the UE 801. In response to receipt of the trigger message, the UE 801 may pass the trigger message (or relevant parts/information of the trigger message) to one or more identified applications in the UE 801. The identified application(s) in the UE 801 may establish a PDU Session to a specific DNN. The SMF 824 may check whether the UE 801 requests are compliant with user subscription information associated with the UE 801. In this regard, the SMF 824 may retrieve and/or request to receive update notifications on SMF 824 level subscription data from the UDM 827.

The SMF 824 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 824 may be included in the system 800, which may be between another SMF 824 in a visited network and the SMF 824 in the home network in roaming scenarios. Additionally, the SMF 824 may exhibit the Nsmf service-based interface.

The NEF 823 may provide means for securely exposing the services and capabilities provided by 3GPP network functions for third party, internal exposure/re-exposure, Application Functions (e.g., AF 828), edge computing or fog computing systems, etc. In such embodiments, the NEF 823 may authenticate, authorize, and/or throttle the AFs. NEF 823 may also translate information exchanged with the AF 828 and information exchanged with internal network functions. For example, the NEF 823 may translate between an AF-Service-Identifier and an internal 5GC information. NEF 823 may also receive information from other network functions (NFs) based on exposed capabilities of other network functions. This information may be stored at the NEF 823 as structured data, or at a data storage NF using a standardized interfaces. The stored information can then be re-exposed by the NEF 823 to other NFs and AFs, and/or used for other purposes such as analytics. Additionally, the NEF 823 may exhibit an Nnef service-based interface.

The NRF 825 may support service discovery functions, receive NF Discovery Requests from NF instances, and provide the information of the discovered NF instances to the NF instances. NRF 825 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 825 may exhibit the Nnrf service-based interface.

The PCF 826 may provide policy rules to control plane function(s) to enforce them, and may also support unified policy framework to govern network behaviour. The PCF 826 may also implement a front end (FE) to access subscription information relevant for policy decisions in a UDR of the UDM 827. The PCF 826 may communicate with the AMF 821 via an N15 reference point between the PCF 826 and the AMF 821, which may include a PCF 826 in a visited network and the AMF 821 in case of roaming scenarios. The PCF 826 may communicate with the AF 828 via an N5 reference point between the PCF 826 and the AF 828; and with the SMF 824 via an N7 reference point between the PCF 826 and the SMF 824. The system 800 and/or CN 80 may also include an N24 reference point between the PCF 826 (in the home network) and a PCF 826 in a visited network. Additionally, the PCF 826 may exhibit an Npcf service-based interface.

The UDM 827 may handle subscription-related information to support the network entities' handling of communication sessions, and may store subscription data of UE 801. For example, subscription data may be communicated between the UDM 827 and the AMF 821 via an N8 reference point between the UDM 827 and the AMF 821 (not shown by FIG. 8). The UDM 827 may include two parts, an application FE and a User Data Repository (UDR) (the FE and UDR are not shown by FIG. 8). The UDR may store subscription data and policy data for the UDM 827 and the PCF 826, and/or structured data for exposure and application data (including Packet Flow Descriptions (PFDs) for application detection, application request information for multiple UEs 201) for the NEF 823. The Nudr service-based interface may be exhibited by the UDR 221 to allow the UDM 827, PCF 826, and NEF 823 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 824 via an N10 reference point between the UDM 827 and the SMF 824. UDM 827 may also support SMS management, wherein an SMS-FE implements the similar application logic as discussed previously. Additionally, the UDM 827 may exhibit the Nudm service-based interface.

The AF 828 may provide application influence on traffic routing, access to the Network Capability Exposure (NCE), and interact with the policy framework for policy control. The NCE may be a mechanism that allows the 5GC 820 and AF 828 to provide information to each other via NEF 823, which may be used for edge computing implementations. In such implementations, the network operator and third party services may be hosted close to the UE 801 access point of attachment to achieve an efficient service delivery through the reduced end-to-end latency and load on the transport network. For edge computing implementations, the 5GC may select a UPF 802 close to the UE 801 and execute traffic steering from the UPF 802 to DN 803 via the N6 interface.

This may be based on the UE subscription data, UE location, and information provided by the AF 828. In this way, the AF 828 may influence UPF (re)selection and traffic routing. Based on operator deployment, when AF 828 is considered to be a trusted entity, the network operator may permit AF 828 to interact directly with relevant NFs. Additionally, the AF 828 may exhibit an Naf service-based interface.

The NSSF 829 may select a set of network slice instances serving the UE 801. The NSSF 829 may also determine allowed Network Slice Selection Assistance Information (NSSAI) and the mapping to the Subscribed Single-NSSAIs (S-NSSAIs), if needed. The NSSF 829 may also determine the AMF set to be used to serve the UE 801, or a list of candidate AMF(s) 221 based on a suitable configuration and possibly by querying the NRF 825. The selection of a set of network slice instances for the UE 801 may be triggered by the AMF 821 with which the UE 801 is registered by interacting with the NSSF 829, which may lead to a change of AMF 821. The NSSF 829 may interact with the AMF 821 via an N22 reference point between AMF 821 and NSSF 829; and may communicate with another NSSF 829 in a visited network via an N31 reference point (not shown by FIG. 8). Additionally, the NSSF 829 may exhibit an Nnssf service-based interface.

As discussed previously, the CN 820 may include an SMSF, which may be responsible for SMS subscription checking and verification, and relaying SM messages to/from the UE 801 to/from other entities, such as an SMS-GMSC/IWMSC/SMS-router. The SMS may also interact with AMF 821 and UDM 827 for notification procedure that the UE 801 is available for SMS transfer (e.g., set a UE not reachable flag, and notifying UDM 827 when UE 801 is available for SMS).

The CN 820 may also include other elements that are not shown by FIG. 8, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 8). Individual NFs may share a UDSF for storing their respective unstructured data or individual NFs may each have their own UDSF located at or near the individual NFs. Additionally, the UDSF may exhibit an Nudsf service-based interface (not shown by FIG. 8). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 8 for clarity. In one example, the CN 820 may include an Nx interface, which is an inter-CN interface between the MME (e.g., MME 721) and the AMF 821 in order to enable interworking between CN 820 and CN 720. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

Figure 9:
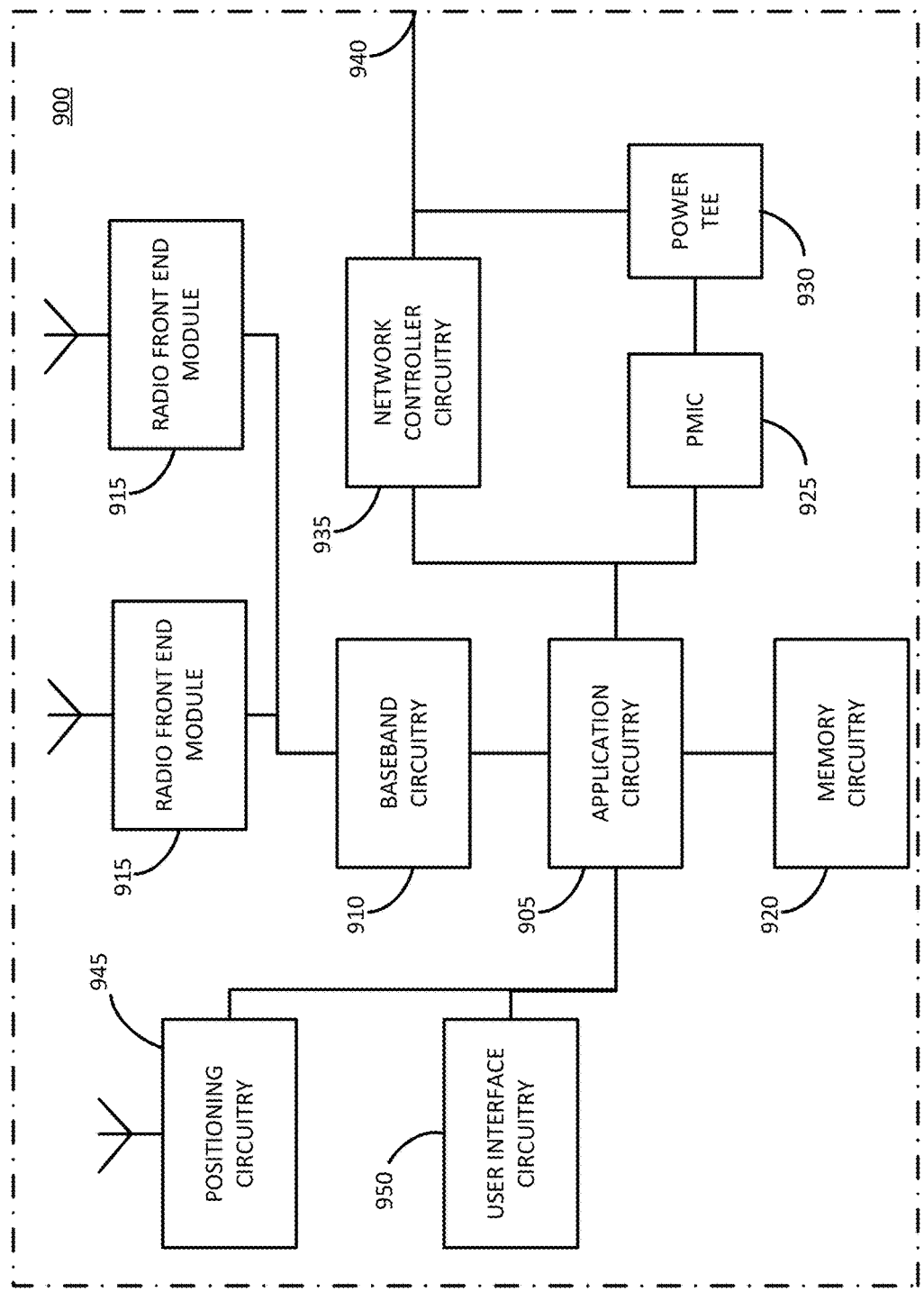
FIG. 9 illustrates an example of infrastructure equipment in accordance with various embodiments.

FIG. 9 illustrates an example of infrastructure equipment 900 in accordance with various embodiments. The infrastructure equipment 900 (or "system 900") may be implemented as a base station, radio head, RAN node, etc., such as the RAN nodes 611 and/or AP 606 shown and described previously. In other examples, the system 900 could be implemented in or by a UE, application server(s) 630, and/or any other element/device discussed herein. The system 900 may include one or more of application circuitry 905, baseband circuitry 910, one or more radio front end modules 915, memory 920, power management integrated circuitry (PMIC) 925, power tee circuitry 930, network controller 935, network interface connector 940, satellite positioning circuitry 945, and user interface 950. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 620 (or other CNs discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 905 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 905 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 900 may not utilize application circuitry 905, and instead may include a special-purpose processor/controller to process IP data received from an EPC or 5GC, for example.

Additionally or alternatively, application circuitry 905 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 905 may comprise logic blocks or logic fabric including and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits. Although not shown, baseband circuitry 910 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

User interface circuitry 950 may include one or more user interfaces designed to enable user interaction with the system 900 or peripheral component interfaces designed to enable peripheral component interaction with the system 900. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 915 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 915. The RFEMs 915 may incorporate both millimeter wave antennas and sub-millimeter wave antennas.

The memory circuitry 920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAIVI), etc., and may incorporate the three-dimensional (3D) cross-point (XPOINT) memories from Intel® and Micron®. Memory circuitry 920 may be implemented as one or more of solder down packaged integrated circuits, socketed memory modules and plug-in memory cards.

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 930 may provide for electrical power drawn from a network cable to provide both power supply and data connectivity to the infrastructure equipment 900 using a single cable.

The network controller circuitry 935 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 940 using a physical connection, which may be electrical (commonly referred to as a "copper interconnect"), optical, or wireless. The network controller circuitry 935 may include one or more dedicated processors and/or FPGAs to communicate using one or more of the aforementioned protocol. In some implementations, the network controller circuitry 935 may include multiple controllers to provide connectivity to other networks using the same or different protocols.

The positioning circuitry 945, which may include circuitry to receive and decode signals transmitted by one or more navigation satellite constellations of a global navigation satellite system (GNSS). Examples of navigation satellite constellations (or GNSS) may include United States'

Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 945 and/or positioning circuitry implemented by UEs 601, 602, or the like) to determine their GNSS position. The GNSS signals may include a pseudo-random code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 945 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 945 may provide data to application circuitry 905 which may include one or more of position data or time data. Application circuitry 905 may use the time data to synchronize operations with other radio base stations (e.g., RAN nodes 611 or the like).

The components shown by FIG. 9 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 10:
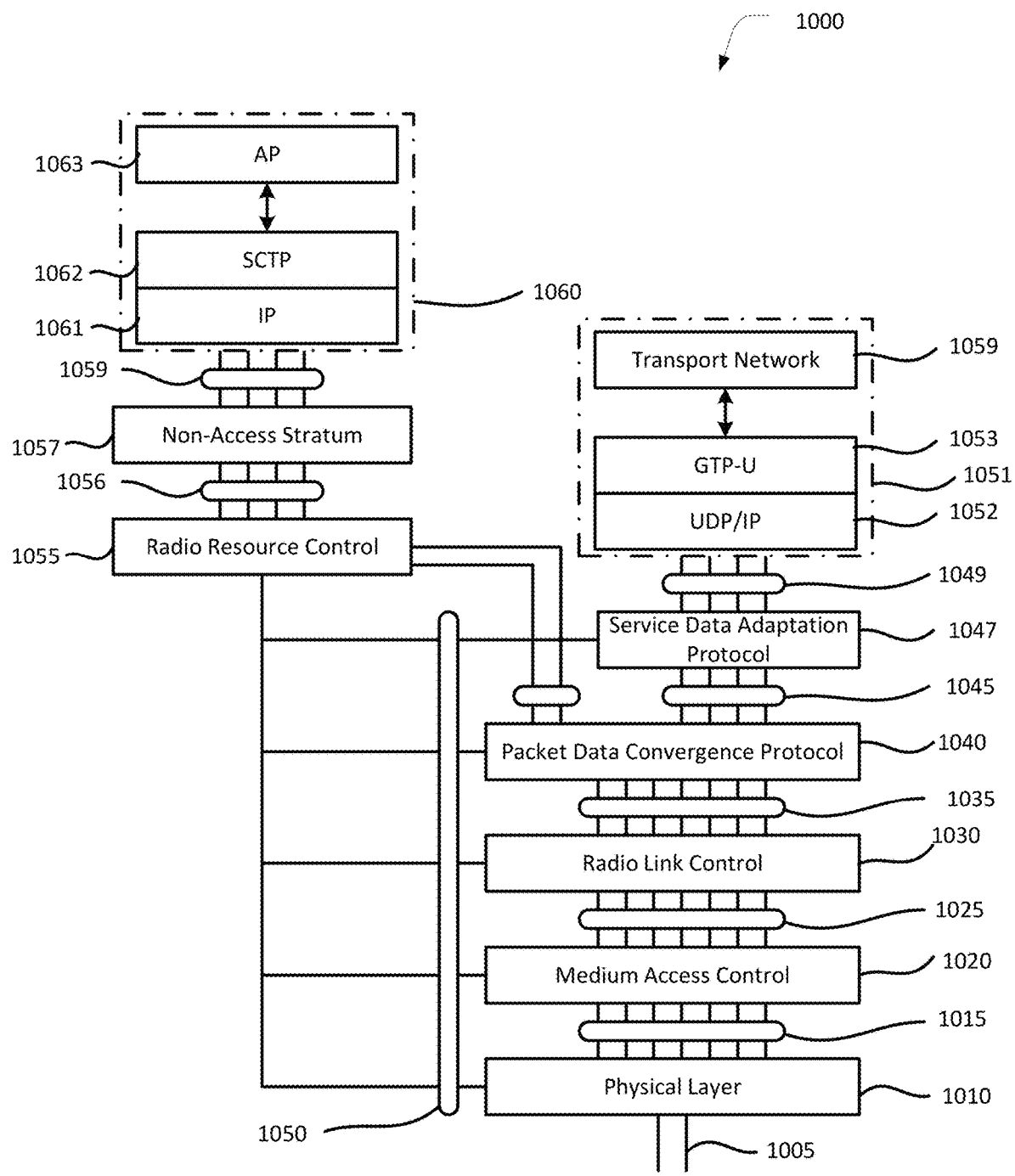
FIG. 10 illustrates various protocol functions in accordance with some embodiments.

FIG. 10 illustrates various protocol functions that may be implemented in a wireless communication device according to various embodiments. In particular, FIG. 10 includes an arrangement 1000 showing interconnections between various protocol layers/entities. The following description of FIG. 10 is provided for various protocol layers/entities that operate in conjunction with the Fifth Generation (5G) or New Radio (NR) system standards and LTE system standards, but some or all of the aspects of FIG. 10 may be applicable to other wireless communication network systems as well.

The protocol layers of arrangement 1000 may include one or more of a physical layer (PHY) 1010, a medium access control layer (MAC) 1020, a radio link control layer (RLC) 1030, a packet data convergence protocol layer (PDCP) 1040, a service data adaptation protocol layer (SDAP) 1047, a radio resource control layer (RRC) 1055, and a non-access stratum (NAS) layer 1057, in addition to other higher layer functions not illustrated. The protocol layers may include one or more service access points (e.g., items 1059, 1056, 1049, 1045, 1035, 1025, and 1015 in FIG. 10) that may provide communication between two or more protocol layers.

The PHY 1010 may transmit and receive physical layer signals 1005 that may be received from or transmitted to one or more other communication devices. The physical layer signals 1005 may comprise one or more physical channels, such as those discussed herein. The PHY 1010 may further perform link adaptation or adaptive modulation and coding (AMC), power control, cell search (e.g., for initial synchronization and handover purposes), and other measurements used by higher layers, such as the RRC 1055. The PHY 1010 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing. In embodiments, an instance of PHY 1010 may process requests from and provide indications to an instance of MAC 1020 via one or more physical layer service access points (PHY-SAP) 1015. According to some embodiments, requests and indications communicated via PHY-SAP 1015 may comprise one or more transport channels.

Instance(s) of MAC 1020 may process requests from, and provide indications to an instance of RLC 1030 via one or more medium access control service access points (MAC-SAP) 1025. These requests and indications communicated via the MAC-SAP 1025 may comprise one or more logical channels. The MAC 1020 may perform mapping between the logical channels and transport channels, multiplexing of MAC SDUs from one or more logical channels onto transport blocks (TB) to be delivered to PHY 1010 via the transport channels, de-multiplexing MAC SDUs to one or more logical channels from TBs delivered from the PHY 1010 via transport channels, multiplexing MAC SDUs onto TBs, scheduling information reporting, error correction through hybrid automatic repeat request (HARD), and logical channel prioritization.

Instance(s) of RLC 1030 may process requests from and provide indications to an instance of PDCP 1040 via one or more radio link control service access points (RLC-SAP) 1035. These requests and indications communicated via RLC-SAP 1035 may comprise one or more RLC channels. The RLC 1030 may operate in a plurality of modes of operation, including: Transparent Mode (TM), Unacknowledged Mode (UM), and Acknowledged Mode (AM). The RLC 1030 may execute transfer of upper layer protocol data units (PDUs), error correction through automatic repeat request (ARQ) for AM data transfers, and concatenation, segmentation and reassembly of RLC SDUs for UM and AM data transfers. The RLC 1030 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1040 may process requests from and provide indications to instance(s) of RRC 1055 and/or instance(s) of SDAP 1047 via one or more packet data convergence protocol service access points (PDCP-SAP) 1045. These requests and indications communicated via PDCP-SAP 1045 may comprise one or more radio bearers. The PDCP layer 1004 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1047 may process requests from and provide indications to one or more higher layer protocol entities via one or more service data adaptation protocol service access points (SDAP-SAP) 1049. These requests and indications communicated via SDAP-SAP 1049 may comprise one or more quality of service (QoS) flows. The SDAP 1047 may map QoS flows to data radio bearers (DRBs), and vice versa, and may also mark QoS flow IDs (QFIs) in DL and UL packets. A single SDAP entity 1047 may be configured for an individual PDU session. In the UL direction, the NG-RAN 620 may control the mapping of QoS Flows to DRB(s) in two different ways, reflective mapping or explicit mapping. For reflective mapping, the SDAP 1047 of a UE 601 may monitor the QoS flow ID(s) of the DL packets for each DRB, and may apply the same mapping for packets flowing in the UL direction. For a DRB, the SDAP 1047 of the UE 601 may map the UL packets belonging to the QoS flows(s) corresponding to the QoS flow ID(s) and PDU Session observed in the DL packets for that DRB. To enable reflective mapping, the NG-RAN 810 may mark DL packets over the Uu interface with a QoS flow ID. The explicit mapping may involve the RRC 1055 configuring the SDAP 1047 with an explicit QoS flow to DRB mapping rule, which may be stored and followed by the SDAP 1047. In embodiments, the SDAP 1047 may only be used in NR implementations and may not be used in LTE implementations.

The RRC 1055 may configure, via one or more management service access points (M-SAP), aspects of one or more protocol layers, which may include one or more instances of PHY 1010, MAC 1020, RLC 1030, PDCP 1040 and SDAP 1047. In embodiments, an instance of RRC 1055 may process requests from and provide indications to one or more NAS entities 1057 via one or more RRC service access points (RRC-SAP) 1056. The main services and functions of the RRC 1055 may include broadcast of system information (e.g., included in Master Information Blocks (MIBs) or System Information Blocks (SIBs) related to the NAS), broadcast of system information related to the access stratum (AS), paging, establishment, maintenance and release of an RRC connection between the UE 601 and RAN 620 (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The NAS 1057 may form the highest stratum of the control plane between the UE 601 and the AMF 821. The NAS 1057 may support the mobility of the UEs 601 and the session management procedures to establish and maintain IP connectivity between the UE 101 and a P-GW in LTE systems.

According to various embodiments, one or more protocol entities of arrangement 1000 may be implemented in UEs 601, RAN nodes 6111, AMF 821 in NR implementations or MME 721 in LTE implementations, UPF 802 in NR implementations or S-GW 722 and P-GW 723 in LTE implementations, or the like to be used for control plane or user plane communications protocol stack between the aforementioned devices. In such embodiments, one or more protocol entities that may be implemented in one or more of UE 601, gNB 611, AMF 821, etc. may communicate with a respective peer protocol entity that may be implemented in or on another device using the services of respective lower layer protocol entities to perform such communication. In some embodiments, a gNB-central unit (gNB-CU) of the gNB 611 may host the RRC 1055, SDAP 1047, and PDCP 1040 of the gNB that controls the operation of one or more gNB-distributed units (DUs), and the gNB-DUs of the gNB 611 may each host the RLC 1030, MAC 1020, and PHY 1010 of the gNB 611.

In a first example, a control plane protocol stack may comprise, in order from highest layer to lowest layer, NAS 1057, RRC 1055, PDCP 1040, RLC 1030, MAC 1020, and PHY 1010. In this example, upper layers 1060 may be built on top of the NAS 1057, which includes an internet protocol layer (IP) 1061, an Stream Control Transmission Protocol layer (SCTP) 862, and an application layer signaling protocol (AP) 1063.

In NR implementations, the AP 1063 may be an NG application protocol layer (NGAP or NG-AP) 1063 for the NG interface 613 defined between the NG-RAN node 611 and the AMF 821, or the AP 1063 may be an Xn application protocol layer (XnAP or Xn-AP) 1063 for the Xn interface 612 that is defined between two or more RAN nodes 611.

The NG-AP 1063 may support the functions of the NG interface 613 and may comprise Elementary Procedures (EPs). An NG-AP EP may be a unit of interaction between the NG-RAN node 611 and the AMF 821. The NG-AP 1063 services may comprise two groups: UE-associated services (e.g., services related to a UE 101, 102) and non-UE-associated services (e.g., services related to the whole NG interface instance between the NG-RAN node 611 and AMF 821). These services may include functions including, but not limited to: a paging function for the sending of paging requests to NG-RAN nodes 611 involved in a particular paging area; UE Context management function for allowing the AMF 821 to establish, modify, and/or release a UE Context in the AMF 821 and the NG-RAN node 611;

mobility function for UEs 601 in ECM-CONNECTED mode for intra-system HOs to support mobility within NG-RAN and inter-system HOs to support mobility from/to EPS systems; NAS Signaling Transport function for transporting or rerouting NAS messages between UE 601 and AMF 821; a NAS node selection function for determining an association between the AMF 821 and the UE 601; NG interface management function(s) for setting up the NG interface and monitoring for errors over the NG interface; warning message transmission function provides means to transfer warning messages via NG interface or cancel ongoing broadcast of warning messages; Configuration Transfer function for requesting and transferring of RAN configuration information (e.g., Self-Organizing Network (SON) information, performance measurement (PM) data, etc.) between two RAN nodes 611 via CN 620; and/or other like functions.

The XnAP 1063 may support the functions of the Xn interface 612 and may comprise XnAP basic mobility procedures and XnAP global procedures. The XnAP basic mobility procedures may comprise procedures used to handle UE mobility within the NG RAN 620 (or E-UTRAN 620), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 601, such as Xn interface setup and reset procedures, NG-RAN update procedures, cell activation procedures, and the like.

In LTE implementations, the AP 1063 may be an S1 Application Protocol layer (S1-AP) 1063 for the S1 interface 613 defined between an E-UTRAN node 611 and an MME, or the AP 1063 may be an X2 application protocol layer (X2AP or X2-AP) 1063 for the X2 interface 612 that is defined between two or more E-UTRAN nodes 611.

The S1 Application Protocol layer (S1-AP) 1063 may support the functions of the S1 interface, and similar to the NG-AP discussed previously, the S1-AP may comprise S1-AP EPs. An S1-AP EP may be a unit of interaction between the E-UTRAN node 611 and an MME 721 within an LTE CN 620. The S1-AP 1063 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1063 may support the functions of the X2 interface 612 and may comprise X2AP basic mobility procedures and X2AP global procedures. The X2AP basic mobility procedures may comprise procedures used to handle UE mobility within the E-UTRAN 620, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 601, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 1063 may ensure reliable delivery of signaling messages between the RAN node 611 and the AMF 821/MME 721 based, in part, on the IP protocol, supported by the IP 1061. The Internet Protocol layer (IP) 1061 may be used to perform packet addressing and routing functionality. In some implementations the IP layer 1061 may use point-to-point transmission to deliver convey PDUs. In this regard, the RAN node 611 may comprise L2 and L1 layer communication links (e.g., wired or wireless) with the MIME/AMY to exchange information.

In a second example, a user plane protocol stack may comprise, in order from highest layer to lowest layer, SDAP 1047, PDCP 1040, RLC 1030, MAC 1020, and PHY 1010. The user plane protocol stack may be used for communication between the UE 601, the RAN node 611, and UPF 802 in NR implementations or an S-GW ZR122 and P-GW 723 in LTE implementations. In this example, upper layers 1051 may be built on top of the SDAP 1047, and may include a user datagram protocol (UDP) and IP security layer (UDP/IP) 1052, a General Packet Radio Service (GPRS) Tunneling Protocol for the user plane layer (GTP-U) 1053, and a User Plane Protocol Data Unit layer (UP PDU) 1063.

The transport network layer 1054 (also referred to as a "transport layer") may be built on IP transport, and the GTP-U 1051 may be used on top of the UDP/IP layer 803 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1053 may be used for carrying user data within the GPRS core network and between the radio access network and the core network. The user data transported can be packets in any of IPv4, IPv6, or PPP formats, for example. The UDP/IP 1052 may provide checksums for data integrity, port numbers for addressing different functions at the source and destination, and encryption and authentication on the selected data flows. The RAN node 611 and the S-GW 722 may utilize an S1-U interface to exchange user plane data via a protocol stack comprising an L1 layer 1011, an L2 layer, the UDP/IP layer 1052, and the GTP-U 1053. The S-GW 722 and the P-GW 723 may utilize an S5/S8a interface to exchange user plane data via a protocol stack comprising an L1 layer, an L2 layer, the UDP/IP layer 1052, and the GTP-U 1053. As discussed previously, NAS protocols may support the mobility of the UE 601 and the session management procedures to establish and maintain IP connectivity between the UE 601 and the P-GW 723.

Moreover, although not shown by FIG. 10, an application layer may be present above the AP 1063 and/or the transport network layer 1054. The application layer may be a layer in which a user of the UE 601, RAN node 611, or other network element interacts with software applications being executed, for example, by application circuitry 905 or application circuitry XT05, respectively. The application layer may also provide one or more interfaces for software applications to interact with communications systems of the UE 601 or RAN node 611, such as the baseband circuitry 910. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 11:
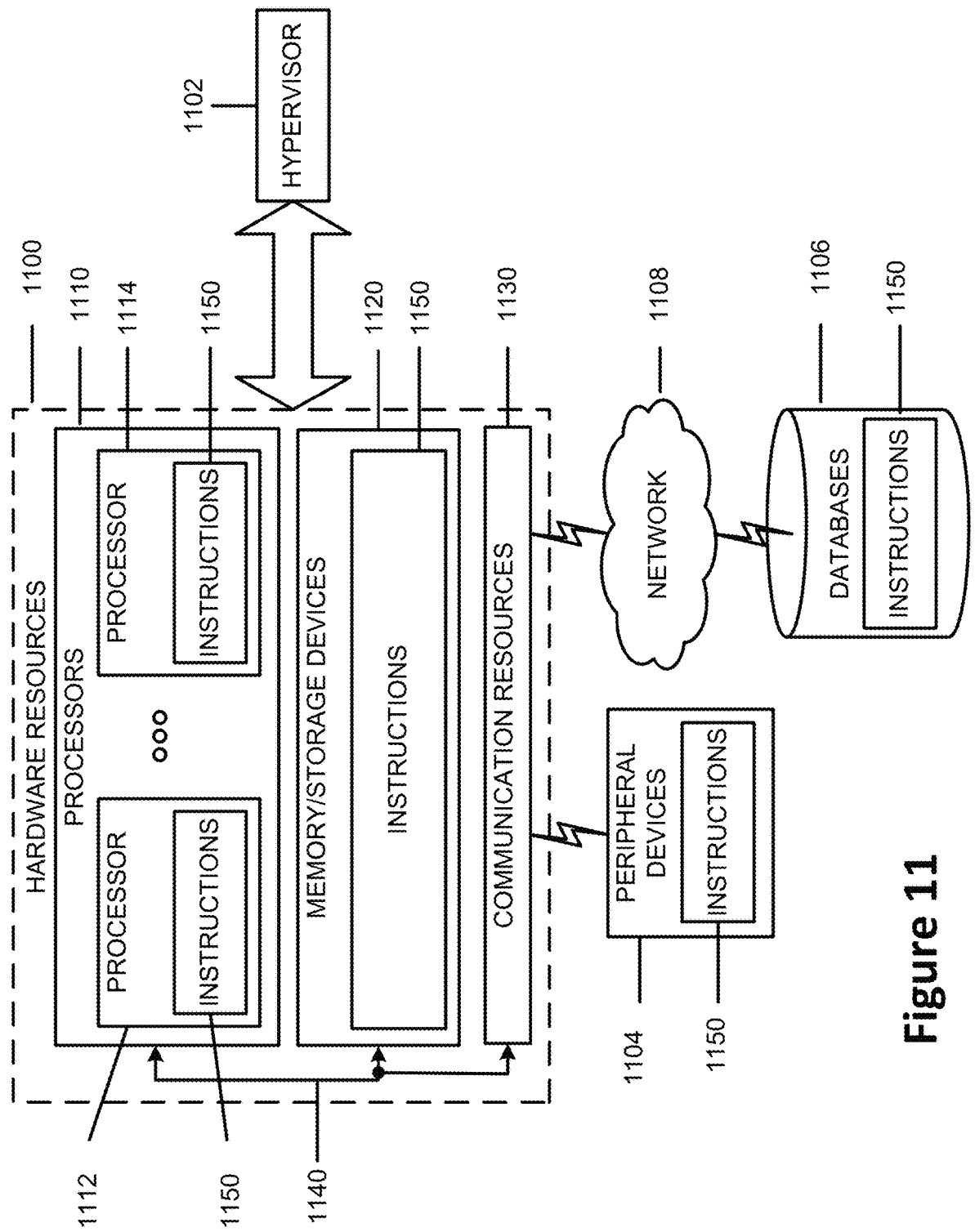
FIG. 11 is a block diagram illustrating components, according to some example embodiments, able to read instructions from a machine-readable or computer-readable medium (for example, a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1102 may be executed to provide an execution environment for one or more network slices/sub-slices to utilize the hardware resources 1100. A "virtualized resource" may refer to compute, storage, and/or network resources provided by virtualization infrastructure to an application, device, system, etc.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of operating an NSMF, the method comprising: instantiating a target uplink classifier (T-ULCL); establishing a forwarding tunnel between the T-ULCL and a source uplink classifier (S-ULCL); and configuring the T-ULCL with packet filters to force uplink traffic from an existing session between a user equipment (UE) and a source application node in a source data network to be forwarded via the forwarding tunnel.

Example 2 may include the method of example 1 or some other example herein, wherein the packet filters are to force the uplink traffic from the existing session to be forwarded to the S-ULCL via the forwarding tunnel.

Example 3 may include the method of example 1 or some other example herein, wherein the packet filters are to further force uplink traffic related to a target application node in a target local data network to the target local data network via a local packet data unit session anchor (PSA).

Example 4 may include the method of example 3 or some other example herein, wherein the packet filters are to further force a set of uplink traffic that does not qualify for forwarding to the target local data network via the local PSA or to the S-ULCL via the forwarding tunnel to a remote PSA.

Example 5 may include the method of example 1 or some other example herein, wherein the instructions, when executed, further cause the SMF to: determine, based on a notification from the S-ULCL or the T-ULCL, absence of active traffic through the forwarding tunnel for a preconfigured period of time; and release the forwarding tunnel based on said determination.

Example 6 may include the method of example 1 or some other example herein, wherein the instructions, when executed, further cause the SMF to: receive, from a source application node, a notification that indicates traffic from or to the UE has ceased; and release the forwarding tunnel based on the notification.

Example 7 may include the method of example 1 or some other example herein, wherein the instructions, when executed, further cause the SMF to: transmit, to a source application node, a notification message to inform the source application node of a change of data network access identifier (DNAI).

Example 8 may include the method of example 7 or some other example herein, wherein the instructions, when executed, further cause the source application node to initiate IP-level or HTTP-level or other upper level redirection mechanism to redirect the UE to a target application node in a target local data network.

Example 9 may include the method of example 1 or some other example herein, wherein the packet filters are to further force domain name server (DNS) requests to a target local data network via a local packet data unit session anchor (PSA).

Example 10 may include the method of example 1 or some other example herein, wherein the instructions, when executed, further cause the SMF to: configure the S-ULCL to forward downlink traffic for the UE through the forwarding tunnel.

Example 11 may include a method of operating a target UPF, the method comprising: receiving one or more session management messages from a session management function (SMF); and instantiating a target uplink classifier (T-ULCL) and a forwarding tunnel between the target UPF and a source UPF based on the one or more session management messages from the SMF, wherein the T-ULCL is to direct uplink traffic from an existing session between a user equipment (UE) and a source application node in a data network to the source UPF via the forwarding tunnel.

Example 12 may include the method of example 11 or some other example herein, wherein the one or more session management messages include packet filters and the method further comprises configuring the T-ULCL with the packet filters to enable the T-ULCL to direct the uplink traffic.

Example 13 may include the method of example 12 or some other example herein, wherein the packet filters are to further cause the T-ULCL to direct uplink traffic related to a target application node in a target data network to the target data network via a local packet data unit session anchor (PSA).

Example 14 may include the method of example 13 or some other example herein, wherein the packet filters are to further force a set of uplink traffic that does not qualify for forwarding to the target data network via the local PSA or to the S-ULCL via the forwarding tunnel to a remote PSA.

Example 15 may include the method of example 11 or some other example herein, wherein the method further comprises: detecting an absence of traffic through the forwarding tunnel for a preconfigured period of time; and sending a notification message to the SMF based on said detection.

Example 16 may include a method of operating a source UPF, the method comprising: receiving a plurality of session management messages from a session management function (SMF); and instantiating a source uplink classifier (T-ULCL) and a forwarding tunnel between the source UPF and a target UPF based on the plurality of session management messages from the SMF, wherein the S-ULCL is to direct downlink traffic from an existing session between a user equipment (UE) and a source application node in a data network to the target UPF via the forwarding tunnel.

Example 17 may include the method of example 16 or some other example herein, wherein the plurality of session management messages include packet filters and the method further comprises configuring the S-ULCL with the packet filters to enable the S-ULCL to direct the downlink traffic.

Example 18 may include the method of example 16 or some other example herein, wherein the method further comprises: detecting an absence of traffic through the forwarding tunnel for a preconfigured period of time; and sending a notification message to the SMF based on said detection.

Example 19 may include a method comprising: detecting a mobility event associated with a user equipment (UE); and transmitting one or more session management messages to establish a forwarding tunnel between a target uplink classifier (T-ULCL) on a target UPF of the plurality of UPFs and a source uplink classifier (S-ULCL), wherein the one or more session management messages are to configure the T-ULCL or the S-ULCL with packet filters to cause traffic to be routed through the forwarding tunnel.

Example 20 may include the method of example 19 or some other example herein, wherein the one or more session management messages are to configure the T-ULCL with packet filters to force uplink traffic from an existing session between the UE and a source application node in a source data network to be forwarded via the forwarding tunnel.

Example 21 may include the method of example 19 or some other example herein, wherein the one or more session management messages are to configure the S-ULCL with packet filters to force downlink traffic from an existing session between the UE and a source application node in a source data network to be forwarded via the forwarding tunnel.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a signal as described in or related to any of examples 1-21, or portions or parts thereof.

Example 27 may include a signal in a wireless network as shown and described herein.

Example 28 may include a method of communicating in a wireless network as shown and described herein.

Example 29 may include a system for providing wireless communication as shown and described herein.

Example 30 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media having instructions that, when executed, cause a session management function (SMF) to:
  instantiate a target uplink classifier (T-ULCL);
  establish a forwarding tunnel between the T-ULCL and a source uplink classifier (S-ULCL); and
  configure the T-ULCL with packet filters to force uplink traffic from an existing session between a user equipment (UE) and a source application node in a source data network to be forwarded via the forwarding tunnel.

2. The one or more non-transitory, computer-readable media of claim 1, wherein the packet filters are to force the uplink traffic from the existing session to be forwarded to the S-ULCL via the forwarding tunnel.

3. The one or more non-transitory, computer-readable media of claim 1, wherein the packet filters are to further force uplink traffic related to a target application node in a target local data network to the target local data network via a local packet data unit session anchor (PSA).

4. The one or more non-transitory, computer-readable media of claim 3, wherein the packet filters are to further force a set of uplink traffic that does not qualify for forwarding to the target local data network via the local PSA or to the S-ULCL via the forwarding tunnel to a remote PSA.

5. The one or more non-transitory, computer-readable media of claim 1, wherein the instructions, when executed, further cause the SMF to: determine, based on a notification from the S-ULCL or the T-ULCL, absence of active traffic through the forwarding tunnel for a preconfigured period of time; and release the forwarding tunnel based on said determination.

6. The one or more non-transitory, computer-readable media of claim 1, wherein the instructions, when executed, further cause the SMF to: receive, from a source application node, a notification that indicates traffic from or to the UE has ceased; and release the forwarding tunnel based on the notification.

7. The one or more non-transitory, computer-readable media of claim 1, wherein the instructions, when executed, further cause the SMF to: transmit, to a source application node, a notification message to inform the source application node of a change of data network access identifier (DNAI).

8. The one or more non-transitory, computer-readable media of claim 7, wherein the instructions, when executed, further cause the source application node to initiate IP-level or HTTP-level or other upper level redirection mechanism to redirect the UE to a target application node in a target local data network.

9. The one or more non-transitory, computer-readable media of claim 1, wherein the packet filters are to further force domain name server (DNS) requests to a target local data network via a local packet data unit session anchor (PSA).

10. The one or more non-transitory, computer-readable media of claim 1, wherein the instructions, when executed, further cause the SMF to: configure the S-ULCL to forward downlink traffic for the UE through the forwarding tunnel.

11. One or more non-transitory, computer-readable media having instructions that, when executed, cause a target user plane function (UPF) to:
  receive one or more session management messages from a session management function (SMF);
  instantiate a target uplink classifier (T-ULCL) and a forwarding tunnel between the target UPF and a source UPF based on the one or more session management messages from the SMF,
  wherein the T-ULCL is to direct uplink traffic from an existing session between a user equipment (UE) and a source application node in a data network to the source UPF via the forwarding tunnel.

12. The one or more non-transitory, computer-readable media of claim 11, wherein the one or more session management messages include packet filters and the instructions, when executed, further cause the target UPF to:
  configure the T-ULCL with the packet filters to enable the T-ULCL to direct the uplink traffic.

13. The one or more non-transitory, computer-readable media of claim 12, wherein the packet filters are to further cause the T-ULCL to direct uplink traffic related to a target application node in a target data network to the target data network via a local packet data unit session anchor (PSA).

14. The one or more non-transitory, computer-readable media of claim 13, wherein the packet filters are to further force a set of uplink traffic that does not qualify for forwarding to the target data network via the local PSA or to the S-ULCL via the forwarding tunnel to a remote PSA.

15. The one or more non-transitory, computer-readable media of claim 11, wherein the instructions, when executed, further cause the target UPF to:
  detect an absence of traffic through the forwarding tunnel for a preconfigured period of time; and
  send a notification message to the SMF based on said detection.

16. One or more non-transitory, computer-readable media having instructions that, when executed, cause a source user plane function (UPF) to:
  receive a plurality of session management messages from a session management function (SMF); and
  instantiate a source uplink classifier (T-ULCL) and a forwarding tunnel between the source UPF and a target UPF based on the plurality of session management messages from the SMF,
  wherein the S-ULCL is to direct downlink traffic from an existing session between a user equipment (UE) and a source application node in a data network to the target UPF via the forwarding tunnel.

17. The one or more non-transitory, computer-readable media of claim 16, wherein the plurality of session management messages include packet filters and the instructions, when executed, further cause the source UPF to:
  configure the S-ULCL with the packet filters to enable the S-ULCL to direct the downlink traffic.

18. The one or more non-transitory, computer-readable media of claim 16, wherein the instructions, when executed, further cause the source UPF to:
  detect an absence of traffic through the forwarding tunnel for a preconfigured period of time; and
  send a notification message to the SMF based on said detection.

19. An apparatus comprising:
  interface circuitry to communicate with a plurality of user plane functions via N4 reference interfaces; and
  control circuitry, coupled with the interface circuitry, to
    detect a mobility event associated with a user equipment (UE); and
    transmit one or more session management messages to establish a forwarding tunnel between a target uplink classifier (T-ULCL) on a target UPF of the plurality of UPFs and a source uplink classifier (S-ULCL), wherein the one or more session management messages are to configure the T-ULCL or the S-ULCL with packet filters to cause traffic to be routed through the forwarding tunnel.

20. The apparatus of claim 19, wherein the one or more session management messages are to configure the T-ULCL with packet filters to force uplink traffic from an existing session between the UE and a source application node in a source data network to be forwarded via the forwarding tunnel.

21. The apparatus of claim 19, wherein the one or more session management messages are to configure the S-ULCL with packet filters to force downlink traffic from an existing session between the UE and a source application node in a source data network to be forwarded via the forwarding tunnel.

22. The apparatus of claim 19, wherein the control circuitry is further to detect a termination event and to transmit another session management message to release the forwarding tunnel.

23. The apparatus of claim 19, wherein the control circuitry is to detect a termination event based on a notification from the T-ULCL or the S-ULCL.

\* \* \* \* \*